(12) United States Patent
Byrnes et al.

(10) Patent No.: US 10,313,466 B2
(45) Date of Patent: Jun. 4, 2019

(54) SYSTEM, APPARATUS, AND METHOD TO IDENTIFY INTELLIGENCE USING A DATA PROCESSING PLATFORM

(71) Applicant: Outlier AI, Inc., Oakland, CA (US)

(72) Inventors: Sean Byrnes, Piedmont, CA (US); Michael Kim, Walnut Creek, CA (US); Anthony Watkins, Virginia Beach, VA (US); Doug Mitarotonda, Burlingame, CA (US); Hetul Patel, El Cerrito, CA (US); Christopher Cranley, Berkeley, CA (US)

(73) Assignee: Outlier AI, Inc., Oakland, CA (US)

( * ) Notice: Subject to any disclaimer, the term of this patent is extended or adjusted under 35 U.S.C. 154(b) by 307 days.

(21) Appl. No.: 15/281,516

(22) Filed: Sep. 30, 2016

(65) Prior Publication Data

US 2017/0098002 A1    Apr. 6, 2017

Related U.S. Application Data

(60) Provisional application No. 62/236,767, filed on Oct. 2, 2015.

(51) Int. Cl.
*H04L 29/08* (2006.01)
*G06F 16/2455* (2019.01)

(52) U.S. Cl.
CPC .... *H04L 67/2833* (2013.01); *G06F 16/24568* (2019.01); *H04L 67/2819* (2013.01)

(58) Field of Classification Search
CPC ......... G06F 17/30516; G06F 16/24578; G06F 16/24568; G06F 16/2455; H04L 29/08
See application file for complete search history.

(56) References Cited

U.S. PATENT DOCUMENTS

| | | | |
|---|---|---|---|
| 2008/0162268 A1* | 7/2008 | Gilbert | G06Q 10/06375 705/7.29 |
| 2010/0235467 A1* | 9/2010 | Dowlatkhah | G06F 17/30566 709/218 |

* cited by examiner

*Primary Examiner* — Cam Y T Truong
(74) *Attorney, Agent, or Firm* — Jeffrey Schox; Padowithz Alce

(57) ABSTRACT

A system and method for implementing a cloud-based data processing platform for identifying intelligence information and insights based on data from a plurality of data sources includes: receiving a plurality of data stream; normalizing each of a plurality of data points in the plurality of data streams; analyzing the normalized data points and associated meta data information; identifying relationships between at least two sets of the normalized data points; and identifying intelligence information and insights based on statistical attributes of the normalized data and identified relationships between them; converting the identified intelligence information and insights into one or more stories; and communicating the one or more stories to a user interface.

19 Claims, 14 Drawing Sheets

SYSTEM, APPARATUS, AND METHOD TO IDENTIFY INTELLIGENCE USING A DATA PROCESSING PLATFORM

CROSS-REFERENCE TO RELATED APPLICATIONS

This application claims the benefit of U.S. Provisional Application No. 62/236,767, filed 2 Oct. 2015, which is incorporated in its entirety by this reference.

TECHNICAL FIELD

Embodiments of the present application relate generally to processing and analyzing a super plurality of data in a data-intensive complex computing architecture. In particular, the embodiments relate to systems, methods, computer program products, and apparatuses for ingesting and analyzing a super plurality of data, identifying intelligence information, and identifying stories therefrom.

BACKGROUND

In the normal course of operations, entities create considerable to very large amounts of electronic data resulting from their operations. In some cases, the amount of electronic data generated can be in the tens of thousands to millions of units of data per day thereby resulting in extremely large data sets (e.g., big data), which can be unstructured and structured. Using big data platforms, some of these entities seek to leverage their big data to obtain beneficial insights and this is done, mainly, by utilizing the big data platform to store the large volume of data and organize the data in a format that is searchable via queries.

A challenge with this model of using the big data platform, however, is that in order to obtain the useful insights that the entities envisions to obtain, an IT administrator or other administrator of the big data platform must be able to run appropriate queries against the data in the platform. Thus, in such a model, the insights may only be useful if the queries against the data are good.

To assist in the use of big data platforms, some software applications are implemented in big data platforms to analyze the incoming data. In such instances, to determine useable data, these applications apply substantial analysis against each unit of datum of incoming data, organize the data, and potentially run automated queries thereon to provide insights or information to the administrator. However, analyzing each unit of datum of these very large datasets in this manner usurps significant computing resources and in turn, delays the data processing and insight determination due to overuse of the computer processors, memory, and other technical computing elements of the big data platform. Further, there is no guarantee that the queries applied by the software applications will, in fact, identify useable data and return useful insights.

Thus, there is a need in the data-intensive complex computing architecture field to create new and useful systems, methods, and apparatuses to be implemented in a data-intensive complex computing architecture for processing big data, identifying useful data, and generating meaningful and exploratory intelligence therefrom. The embodiments of the present application provide such new and useful systems, methods, computer program products, and apparatuses.

DESCRIPTION OF THE PREFERRED EMBODIMENTS

Figure 1:
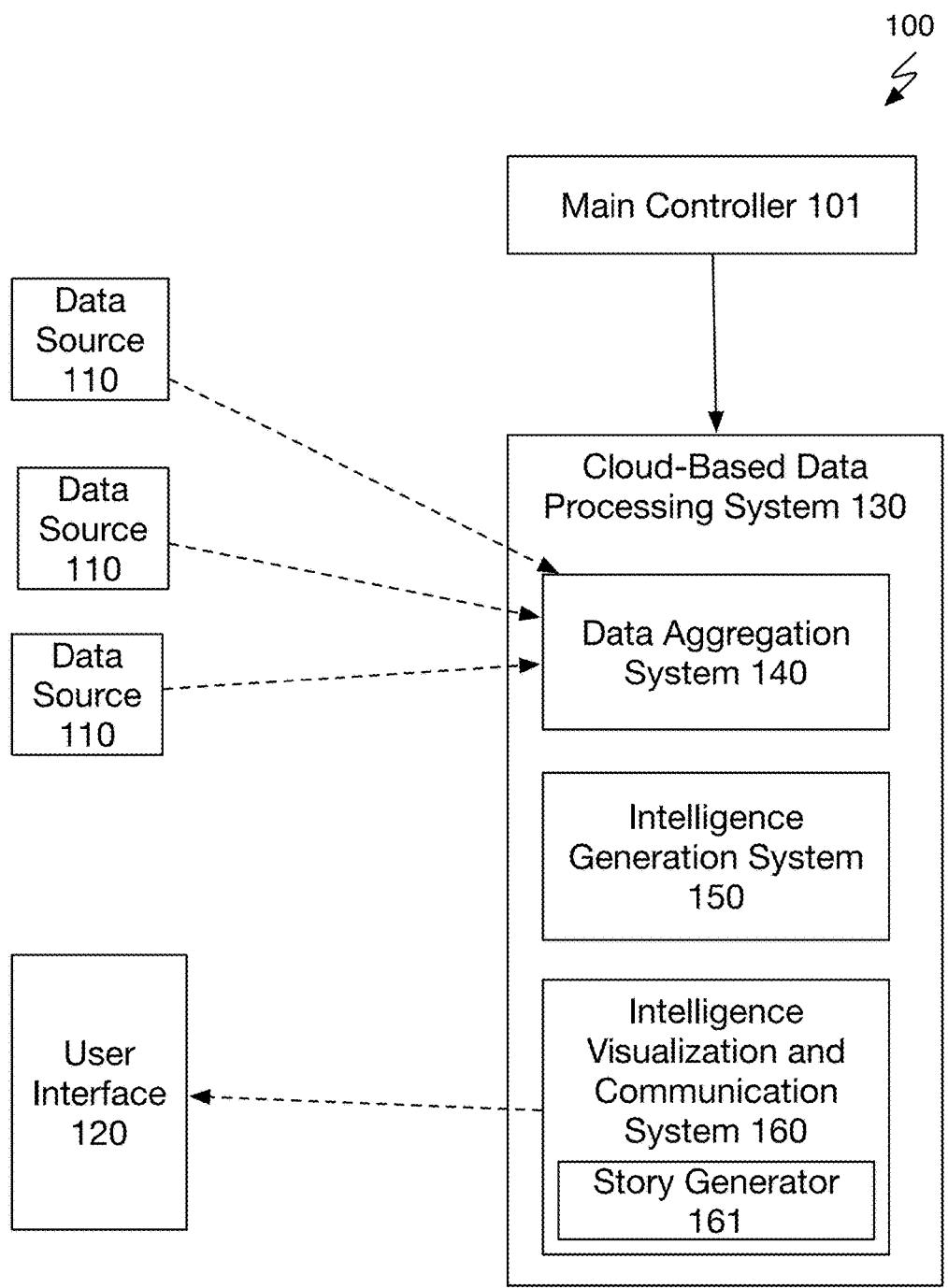
FIG. 1 is a schematic representation of a system of a preferred embodiment of the present application.

The following description of the preferred embodiments of the invention is not intended to limit the invention to these preferred embodiments, but rather to enable any person skilled in the art to make and use this invention.

Overview

In traditional big data platforms, it is an objective to store large amounts of data, organize the data, and sometimes apply one or more techniques to deliver useful information based on the data therein. A technique that may be typically applied by these traditional data platforms often involves, after receiving data from various data sources, joining the data from the various sources near immediately based on user identity. Thus, after receipt of the data from the various data sources and either prior to storage or sometime soon after storage, the traditional big data platforms attempt to join the data streams together based on user identity and then compute against the joined data streams. That is, in such platforms, multiple data streams are joined near immediately and computation of the joined data streams occurs near immediately after receipt at the big data platform.

Additionally, in these traditional big data platforms, it is an objective to join data and/or data streams from the various sources based on an identity of a user (or entity) which may be associated with the data. As such, these big data platforms seek to identify who the user associated with the data may be and whether that data belongs to the user. In this way, these traditional platforms seek to determine causative characteristics of an event based on the user who may be associated with the event and/or data and subsequently, provide insights regarding the event in light of the identity of the user. However, there is a significant problem with this approach, in that, these traditional platforms are attempting to solve the unique identity problem, which is nearly impossible to solve. Meaning that it is difficult to identify a user who is associated with each and every electronic event that occurs or otherwise, causes the generation of electronic data.

According to a different approach disclosed in the present application, an identity of a user creating or associated with electronic data and causative events may be disregarded, in some embodiments, because as attempts to determine user identities and causation for every unit of data associated with an event requires a great amount of computing resources (e.g., processing power, storage, etc.). Rather, according to one or more embodiments of the present application, to determine useful intelligence information, it is sufficient to obtain event data from multiple data streams at the outset without the requirement to join the data streams, identify users associated with the data, or determine causative characteristics of the data. In such embodiments, it is not necessary to compute against each and every datum point at the outset of implementing data processing at the data processing platform to determine these things. Instead, in these embodiments, most or all of the data entering the data processing platform are processed in a same manner without specifically computing against the data to determine characteristics, user identities, causative events associated with the data, and/or other information.

In the above-mentioned embodiments, only after data is collected, normalized, and characterized does the data processing platform compute against the data to determine useful information from the data. For example, in these embodiments, fifty thousand (50,000) units of data may be aggregated from various data vendors and entered into the data processing platform for processing into intelligences. In such example, most, if not all, of the 50,000 units of data would be normalized and characterized. And, only after each of the 50,000 units of data are normalized and characterized does the data processing platform compute against the 50,000 units of data to obtain intelligence information. At an intelligence processing section of the data processing platform, the 50,000 units of data may be computed against using predetermined rules, algorithms, and the like to reduce the 50,000 units of data to approximately 400 units of useable data. The 400 units of useable data may further be computed against to an even smaller number of useable data units, such as 7 units or so, to then identify intelligence information and insights. In such embodiments, it is possible to effectively reduce a very large data pool from various data sources by up to 99% or more (e.g., from 50,000 units of data to 7 units of data=99.986% reduction). These various technical advantages of the inventive data processing system allow for the consumption and processing of a great amount data from one or more sources on a daily (or hourly) basis to identify a select few critical or significant data points from which intelligence information is determined.

Referring to FIG. 1, a schematic representation of an intelligence system 100 for implementing data processing with a big data platform for identifying business intelligence and stories based on entity data is described. The intelligence system 100 is configured to obtain and consume data associated with an entity, such as a business entity, and generate intelligence information (e.g., business intelligence) in one or more formats including in the format of stories that are published to a story feed of a user interface accessible to the entity. In many embodiments, the entity referred to herein is a business entity; however, it shall be understood that the entity may also refer to any type of operational entity or other type of entity having electronic data associated therewith.

As shown in FIG. 1, the intelligence system 100 includes a main controller 101, a plurality of data sources 110, user interface 120, cloud-based data processing system 130, a data aggregation system 140, intelligence generation system 150, and intelligence visualization and communication system 160.

The main controller 101 comprises one or more of one or more microprocessors, one or more computer process units (CPUs), one or more chip-sets, one or more processing circuits, and the like. The main controller 101 preferably includes a memory or is in operable communication with one or more memory or storage devices. The main controller 101 of a preferred embodiment operates to controller the entire intelligence system 100 and/or system 200 and is able to autonomously and automatically implement the processes of any methods disclosed herein including the process flows of methods 400-500.

The plurality of data sources 110 of a preferred embodiment are disparate and distinct sources of data, which operate independently of each other such that the data generated or provided by each of these plurality of data sources are generally not the same or redundant. However, it shall be noted that there may be some instance in which two distinct and independent data sources generate the same or similar data based on an occurrence of a same or similar single event or a same or similar multiple events. Additionally, and/or alternatively, in some embodiments, the plurality of data sources (and other components of the intelligence system 100) may be interconnected to the intelligence system 100 via a network, such as an entity maintained network, or a public network, such as the Internet, maintained or operated by a third party (e.g., Google Analytics, Amazon Web Services, and the like).

Figure 8A:
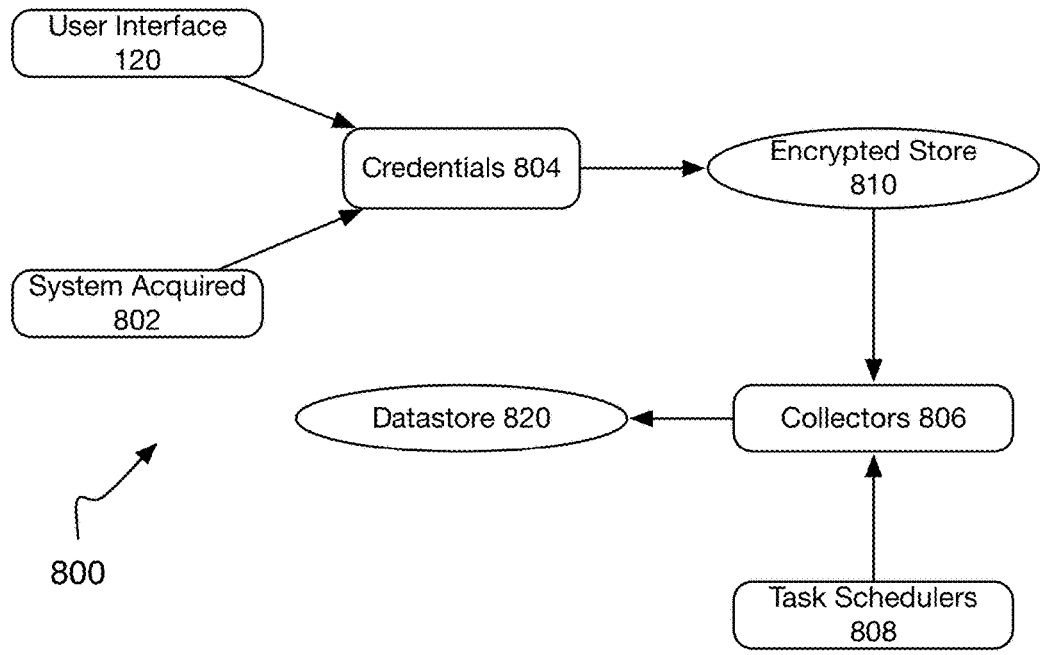
FIGS. 8A and 8B illustrate schematics and process flows associated with data aggregation of preferred embodiments of the present application.

The user interface 120 of a preferred embodiment is used to interact with and/or otherwise control one or more components and one or more operations of the intelligence system 100. The user interface 120 preferably includes a display, such as a display panel or combination display and touch panel, and other input and output devices to allow a user to obtain information and outputs via the user interface 120 and also, provide inputs and information via the user interface 120. As shown in FIG. 8A, a representative schematic and process flow 800 of a preferred embodiment in which the user interface 120 is used by one or more users to control operations and components of the intelligence system 100 related to data acquisition and aggregation is described. The schematic and process flow 800 is used to collect entity data from various data vendors. In one or more embodiments, the entity data is data directly associated with the entity, itself, and/or more generally, directly or indirectly associated with the operations of the entity. The entity data includes, but is not limited to business data associated with the entity.

The schematic and process flow 800 includes the user interface 120, encrypted store 810, data store 820, system acquired 802, credentials 804, collectors 806, and task scheduler 808. The schematic and process flow 800 illustrates an exemplary schematic and process flow for aggregating data by the data aggregation system 140 in conjunction with the use of the user interface 120, which is preferably used to interact with and/or operate the collectors 806 and task scheduler 808. In the schematic and process flow 800, a user uses user interface 120 to authenticate based on interactions with credentials 804 which are stored and/or otherwise, accessible via the encrypted store 810. In such application, the user interface 120 is used to operate the task scheduler 808 to identify or provide a schedule for collecting data or otherwise, collecting data from a plurality of data sources and/or data vendors. For instance, once one or more schedules and/or collection schemes for collecting data from various data sources are set (e.g., programmed or pre-programmed) into the task scheduler 808, the task scheduler 808 can either communicate the schedule to the collectors 806 and/or operate the collectors 806 according to the one or more schedules provided. In this way, the collectors 806 can operate autonomously to automatically aggregate data based on its interaction with the task scheduler 808. It shall be understood that while the task scheduler 808 is primarily used in a preferred embodiment to control and/or operate one or more operations or components of the schematic and process flow 800 to control data acquisition and storage in the intelligence system 100, the task scheduler 808 can additionally and/or alternatively be used for a number of other tasks including, but not limited to, the transmission and receipt of data from any source within or external to the intelligence system 100 and scheduling tasks, such as scheduling the timing and/or order at which the data is processed at various components of the intelligence system 100. For instance, the task scheduler 808 of an exemplary embodiment is used to identify or provide a scheduling for processing the data at the normalizing unit and/or the data characterization unit of the intelligence system 100. In such embodiment, the task scheduler 808 provides an order indicating the sequence in which the collected data is processed in the intelligence system 100, a frequency at which collected data is processed within the intelligence system 100, and times and/or dates for processing the collected data.

Additionally, and/or alternatively, the schematic and process flow 800 operates automatically to manage constraints on data acquisition imposed by various data vendors (e.g., one or more of the plurality of data sources), and automatically ensures that data is periodically and/or continuously current in the intelligence system 100. For instance, in a preferred embodiment, the task scheduler 808 is able to obtain one or more parameters from each of the various data vendors. The parameters from each of the various data vendors, in some embodiments, relate to data availability schedules indicating the availability and timing at which data is available to be collected by a specific data source or data vendor among various data vendors and sources and also, other parameters relating to the amount of data that can be aggregated during a data aggregation session, offline and online periods of the various data vendors and sources.

The cloud-based data processing system 130 of a preferred embodiment includes a plurality of remotely located servers, databases, computers processors, distributed storage system, and the like that are in operable communication with each other and other components of intelligence system 100 over one or more networks. While system 130 is generally described herein as being cloud-based, it shall be understood that the system 130, in a variation of intelligence system 100 and/or system 200, can be an on-premises system and/or otherwise, an entity maintained data processing system. For instance, in some embodiments, an entity may maintain and/or otherwise operate an intelligence system having a system architecture similar to or the same as any of the systems described herein, and namely, intelligence system 100 and/or system 200. Thus, while a cloud-based data processing system may be considered, in most instances, to be a remotely located and/or off-premises system, it shall be understood that the cloud-based data processing system may also be an on-premises system that is local to entity using the system or, at a minimum, operated or maintained by the entity.

The data aggregation system 140 of a preferred embodiment is implemented in such a way to aggregate and collect data associated with an entity and also, aggregate and collect data about the world. The data about the world preferably includes, but is not limited to, data associated with other entities (e.g., business entities, operational entities, and the like), data associated with weather (e.g., past, present, and future weather), data associated local and global events, and generally any information and/or data that is useable in the intelligence system 100 for identifying and/or determining intelligence information. The schematic and process flow 800 and the schematic and process flow 850 of FIG. 8B of a preferred embodiment are used either in combination or individually for the purposes of data aggregation in accordance with the data aggregation system 140.

In a preferred embodiment, the cloud-based data processing system 130 aggregates data associated with a plurality of entities. In an exemplary embodiment, the plurality of entities are a plurality of disparate and/or non-corporately related businesses or companies. Since system 130 is cloud-based, the system 130 is able to aggregate and analyze data of all the entities for which the system 130 aggregates data. This gives rise to various benefits that are only possible because the system 130 is cloud-based. For instance, in a preferred embodiment, the cloud-based data processing system 130 aggregates data for each of a plurality of entities. In such embodiment, it is possible that some of the plurality of entities compete directly in the same or similar markets. The cloud-based system 130, as described in more detail herein, is able to critically analyze the data to determine metrics and/or stories based on the data for each of the plurality of entities. Since each of the plurality of companies analyzes its data with the cloud-based system 130, comparison functions may be applied to the analyzed data for each of the plurality of companies to determine how each of the plurality of entities perform with respect to other of the plurality of entities using the cloud-based data processing system 130 and more specifically, the intelligence system 100 and/or system 200.

Based on a comparison of the analyzed data for each of the plurality of entities, performance scores and/or performance rankings in one or more dimensions of the analyzed data set may be provided to the companies. For instance, two business of a plurality of businesses may use the cloud-based data processing platform 130 and/or the intelligence system 100 to determine intelligence information and insights in the bicycle sales market in which both businesses compete. In such embodiment, because these two businesses, as well as other businesses that compete in the bicycle sales market, use the intelligence system 100 for intelligence information, the intelligence system 100 can compare the performance of the two businesses to each other, as well as to the other related business on the platform. In this way, the intelligence system 100 can determine performance scores for each of the businesses, which may then be used to rank the businesses to each other. For example, a high performance score may correspond to a high level of performance of a business in a particular market segment.

Additionally, and/or alternatively, the intelligence system 100 can identify the facets and/or segments associated with the data of the plurality of businesses to provide business performance and rank information in a specific segment. For instance, the intelligence system 100 of a preferred embodiment aggregates data streams of bike sales information for each of the businesses. However, the data streams of bike sales may be multi-faceted in that the data streams include defining aspects that help determine or identify parameters or values for of a data set. In one example, one business may have $1000 in bike sales; however, a facet or dimension of that data point may be a gender of the buyers accounting for the $1000 of bikes sales or the age of the buyers. With respect to the two facets of gender and age of the data set, it may be determined that that 52% of the bike sales were made by women and 48% were made by males and buyers between the ages of 20-32 accounted for 68% of the bike sales while buyers of ages between 33-40 accounted for 21% of the bike sale. These two facets of the data set may be used to further segment the data and also, be used in the comparison of the two business to determine which business ranks higher in performance in the two facets.

Thus, an additional benefit of the cloud-based intelligence system is that multiple entities which process their data in the system can then leverage the fact that system has access to the data of a number of business either competing or not competing, which can be used to provide rank information for each specific business using the system or platform. This rank information is preferably provided by the story generation system 161 as content in one or more stories.

Figure 8B:
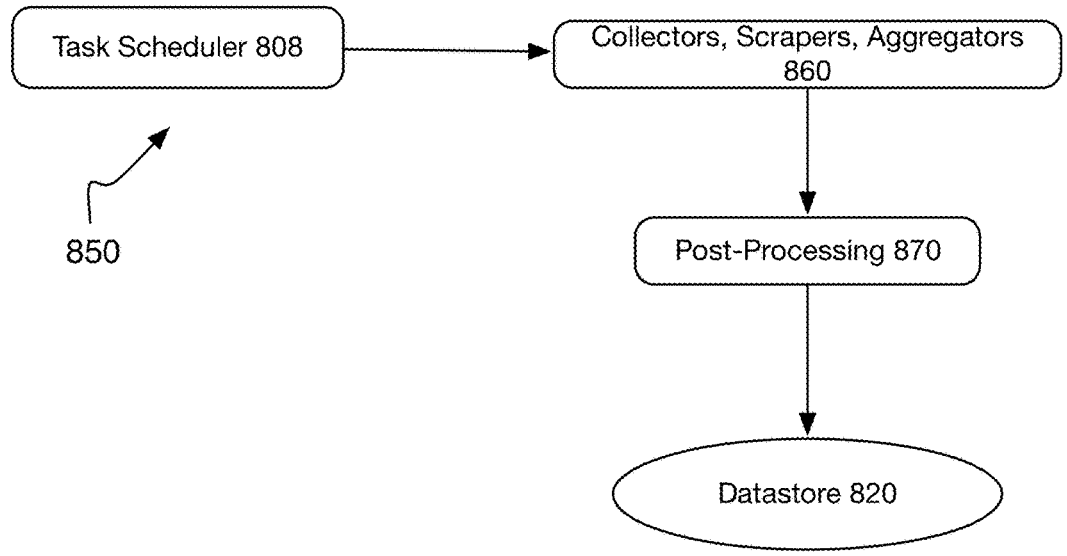

Additionally, and/or alternatively by implementing the schematic and process flow 850 of FIG. 8B, the data aggregation system 140 collects and uses data about the world to be use in identifying intelligence and insights. The data collected by the schematic and process flow 850 may be referred to herein as "global data," which is generally data that is publicly available from one or more data sources or data vendors and is data that is generally not directly or indirectly generated or resulting from processes and/or operations of the entity for which the intelligence system 100 determines intelligence information and/or insights. The global data is preferably collected on a scheduled basis using the task scheduler 808, which communicates a data collection schedule to the collectors, scrapers, aggregators unit 860 for obtaining global data from each of various global data sources and/or global data vendors. The user interface 120 of the intelligence system 100 is preferably used to interact with the task scheduler 808 for the purposes of aggregating global data.

The schematic and process flow 850 also includes a post-processing unit 870 that receives the collected global data from the collectors, scrapers, aggregators unit 860 and is preferably used to convert the global data into a format that is compatible for use with the intelligence system 100. The post-processing unit 870 is preferably operates similarly to or equally as the normalization unit 152 and the data characteristics unit 153 of the intelligence system 150. Once the global data has undergone post-processing at the post-processing unit 870, the post-processing unit 870 transmits the global data to a data store. The data store, in some embodiments, is data store 820. Additionally, and/or alternatively, the data store receiving the global data is separate and distinct from the data store 820, which stores entity data. In this way, the intelligence system 100 can easily distinguish between entity data and global data since the entity data and the global data would be stored in, at least, two separate data stores.

Figure 3:
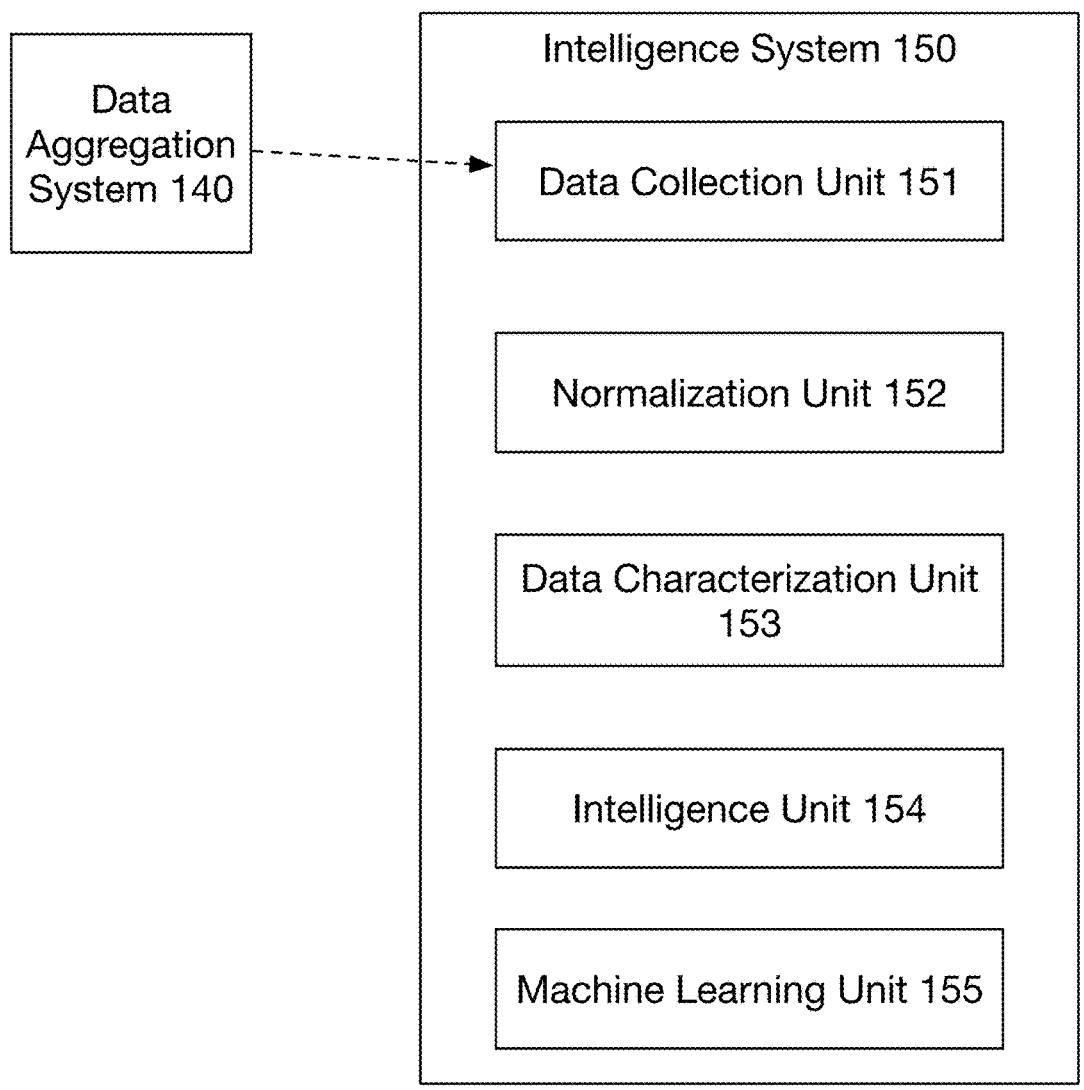
FIG. 3 is a detailed schematic of an intelligence system of a preferred embodiment of the present application.

The intelligence system 150, as shown in more detail in FIG. 3, includes data collection unit 151, normalization unit 152, a data characterization unit 153, intelligence unit 154, and machine learning unit 155. Each of these may be implemented by one or more computer processing units (CPUs) or otherwise, controlled by the main controller 101.

The data collection unit 151 of a preferred embodiment receives structured and/or unstructured data (e.g., raw data) from the data aggregation system 140. The data collection unit 151 controls the transmission of data to the normalization unit 152. Specifically, the data collection unit 151 controls the amount of data that is transmitted to the normalization unit 152 and the timing at which the data is transmitted to the normalization unit 152. Additionally, and/or alternatively, the data collection unit 151 collects the raw data from the data aggregation system 140 in such a manner and/or format that is readily accessible and useable by the normalization unit 152.

The data collection unit 151 of a preferred embodiment includes one or more storage devices, such as a non-transitory computer-readable medium (e.g., memory). Additionally, and/or alternatively, the data collection unit 151 of an exemplary embodiment includes a plurality of separate and distinct storage units in which data aggregated from the data aggregation system 140 are stored in accordance with a particular data source. Each of the plurality of separate and distinct storage units, in such embodiment, is preferably assigned and/or specifically dedicated for receiving and storing data from one or more specific data sources and/or one or more specific data vendors. In this way, the data collection unit 151 is able to organize the data aggregation system 140 in such a manner that is more easily comprehensible and useable by the normalization unit 152. For instance, in some embodiments, the normalization unit 152 selectively processes only data at the data collection unit 151 from a specific data source or specific data vendor that is stored in a designated storage unit in order to identify anomalies and/or intelligence information solely from the specific data source. In this manner, the intelligence system 100 is able to isolate data processing to a specific data source for determining intelligence for various reasons including for reducing the amount of computing resources used in the data processing and data analysis units. Additionally, and/or alternatively, the normalization unit 152 is able to selectively identify a plurality or two or more of separate and distinct storage units at the data collection unit 151 to create a specific subset combination of data sources from the plurality of data sources to perform data processing and data analysis to the data stored therein.

Upon receipt and/or in response to receiving a transmission of data, the normalization unit 152 of a preferred embodiment normalizes the data into a structured or further structured format that is useable and/or more compatible to be processed by the data characterization unit 153 and intelligence unit 154. Specifically, the normalization unit 152 normalizes the received data into a standardized format by adding meta data and/or by associating/linking descriptive data to the received data. For instance, in an exemplary embodiment, the normalization unit 152 normalizes received data from the collection unit 151 by adding a time stamp describing a time and/or date describing a time and data associated with each datum in the received data. In such exemplary embodiment, the normalization unit 152 may also add meta data that includes a geographical location associated with the data, entities associated with the data, identifying information about computing systems associated with the data, source(s) of the data, and/or the like. The meta data added to the received data by the normalization unit 152 may be any kind of data that provides information about the data.

After the data is normalized, the data characterization unit 153 of a preferred embodiment continues to identify one or more parameters and/or identify one or more characteristics of the normalized data. The data characterization unit 153 preferably includes a computer processor operably coupled or in communication with a memory. The memory preferably includes a program that, when executed by the computer processor of the data characterization unit 153, causes the data characterization unit 153 to implement one or more algorithms and/or analytic techniques to identify characteristics of the normalized data. Specifically, the characterization unit 153 identifies one or more characteristics of the normalized data including, but not limited to, trends included therein, cyclicality and/or seasonality patterns within the normalized data, outliers or anomalies within the normalized data, and other statistical properties, as shown by way of example in FIGS. 11A-11E. Further, the characterization and analytical techniques applied by the data characterization unit 153 are similar to those implemented by the modeler 725 and the detector 735 in this application.

The intelligence unit 154 of a preferred embodiment then applies an intelligence acquisition process for inferring and extracting insights from the characterizations determined from the data. The insights obtained from the data include an accurate and deep intuitive understanding of the data, which is not obvious from the data in its raw form, but become clear the processes of the intelligence system 100 are applied and the intelligence unit 154 extracts and infers the resulting insights and intelligence. The intelligence acquisition process applied by the intelligence unit 154 involves applying at least one of or a combination of predetermined queries, predetermined rules, and machine learned processes to the characterized data to thereby infer and/or identify intelligence and/or insights from the data. Thus, the determined at the intelligence unit 154 may include, but is not limited to, insights, inferences, hypothesis, and other useful information that is obtained from an analysis and intelligence processing of the data.

Preferably, after the data is processed at the intelligence unit 154, the data is further processed at the intelligence visualization and communication system 160. In a preferred embodiment, the intelligence visualization and communication system 160 generates from the intelligence data identified at the intelligence unit 154 visual representations and varying modes of communicating the intelligence to a user and/or user interface. Additionally, and/or alternatively, the intelligence visualization and communication system 160 includes a story generator 161. The story generator 161, in some embodiments, may also be referred to as a headline generator.

The story generator 161 of a preferred embodiment of the present application is configured to compile intelligence information identified at the intelligence unit 154 and otherwise into one or more stories and/or generate one or more stories. Specifically, the one or more stories compiled or generated by the story generator 161 are based on one or more data points processed at the data processing pipeline of intelligence system 100. The one or more stories preferably include content associated with each of the one or more data points used in generating the one or more stories. The content of the one or more stories preferably include details describing an event associated with or that triggered the creation of the data points, one or more models or illustrations (e.g., graphs and the like) of the data points and/or with analysis techniques applied thereto, description of the results of the analysis applied to the data, and the like. The description of the results of the analysis applied to the data of an exemplary embodiment indicates in trends in the data, any cyclicalities and/or seasonalities in the data, a description of the data being compared in any of the illustrations, details and descriptions of anomalies and/or outliers existing in the data, and the like. Additionally, and/or alternatively, the one or more stories of a preferred embodiment include, but is not limited to, one or more of data characteristics, noteworthy changes in data characteristics, data quality descriptions, data relationships and changes in relationships, summaries of sets of stories, data forecasting, comparative and normative descriptions of data, recommendations and suggestions on data analytics, noteworthy and relevant news, and the like. Further, the one or more stories, in some embodiments, include information (e.g., notifications of updates, promotions and requests for feedback) related to or about the intelligence system 100 or system 200.

Additionally, and/or alternatively, the one or more stories of a preferred embodiment include selectable content and/or selectable features therein. The selectable content and/or selectable features within the one or more stories are preferably used to encourage further exploration and/or analysis by a user or entity viewing the story. In such embodiment, a user or entity is able to select content within the stories, such as a model (e.g., a graph) of the data points, and selectively select portions of the model to obtain further information about specific data points in the model. The content provided in the one or more stories can, therefore, be dissected and/or manipulated by a user or other operator for the purposes of exploration and discovery of insights and other information. Additionally, while exploring the model within a story, a user can select portions of the model to be modified thereby changing values associated with the data points to perform projections or other manipulations to discover information about the data points within the model.

Additionally, and/or alternatively, at the story generator 161, a plurality of stories generated from varying data sets are compiled into a single story. In such instances, it is determined at the story generator that the relationship between the plurality of stories is sufficiently related, such that the plurality of stories should be compiled and/or presented together. Thus, at the story generator 161, a computation of relatedness of multiple stories is performed and based on a relatedness factor, the story generator 161 determine that several of the stories should be compiled together. In the computation of relatedness, the story generator 161 compares the headlines and/or content of the stories to each other. This comparison of the stories is used to determine the relatedness factor. Accordingly, based on the computational comparison of the stories, the story generator 161 determines a relatedness score which indicates a level of consistency between the content of two or more compared stories. When the relatedness score between two or more stories are greater than a predetermined relatedness threshold, the story generator 161 determines that the two or more stories are sufficiently related such that the two or more stories should be complied together into a single story.

Additionally, and/or alternatively, after the comparison of the two or more stories, the story generator 161 also applies a redundancy computation thereby identifying some of the two or more stories are substantially so related that the content within these stories is redundant and therefore, the story generator 161 eliminates one or more stories identified as being redundant. In the redundancy computation of a preferred embodiment, the story generator 161 determine a relatedness score and/or a redundancy factor between two or more stories and when that relatedness score exceeds a predetermined redundancy threshold, it is determined that the content within the two or more stories are sufficiently related and substantially the same such that the content is redundant. The predetermined redundancy threshold of a preferred embodiment is a higher threshold than the predetermined relatedness threshold and thus, renders a higher relatedness score or factor between two stories. For instance, the story generator 161 when evaluating ten (10) stories may determine that five (5) of the ten stories should be considered together, due to relatedness, in order to determine whether or not these five stories should be compiled into a single story.

In such instance, the story generator may determine that two of the five stories are sufficiently and substantially related such that the two stories are redundant with respect to each other. In such an instance, the story generator 161 eliminates one of the two stories thereby leaving only four stories to consider for compiling. With respect to the four remaining stories, the story generator 161 applies a relatedness computation against these stories to determine whether the relatedness score some or all of the remaining four stories exceeds a predetermined relatedness factor. In this example, the story generator 161 may determine that the relatedness score between only three of the four stories exceeds the predetermined relatedness threshold such that only the three stories should be compiled into a single story to be presented via a news feed format.

The complied story of a preferred embodiment presents only one of the stories compiled therein as a headliner (e.g., the topic or subject of a story that a user views in a news feed) and the other stories (e.g., sub-stories) compiled into the compiled story are accessible or viewable only after selecting the main headliner of the single story. Once the headliner or other portion of the compiled story is selectable, the other stories (e.g., non-headlining stories) compiled therein can then be selected and viewable by a user. The selected sub-stories of a preferred embodiment formulated content, as described further below, which can be selected by a user or otherwise, to explore and further analyze the data associated with the formulated content.

As mentioned above, the one or more stories identified at the story generator 161 are preferably presented to a user via a news feed format. It will be understood that, while it is generally disclosed that the stories are presented to a user or entity in a news feed format, the one or more identified stories can be presented in any format attainable to a user or entity including, but not limited to, in an email format or text message (sms messaging), chat messaging format, and the like.

Additionally, and/or alternatively, a machine learning unit 155 of a preferred embodiment is applied in the intelligence system 100 for several purposes, including observing, capturing data, and learning at the story level. The story level includes the level at which the one or more stories are generated and/or the one or more stories are presented to the user via a user interface or the like. Thus, the machine learning unit 155 is configured to observe and capture all activities associated with the generation of the stories as well as all activities associated with the interactions of a user or entity with the stories once presented. The observable activities at the story level and other observable interactions and activities within the intelligence system 100 and related systems are used as training data for training or as input into the machine learning unit 155.

Specifically, the machine learning unit 155 analyzes the observable activities at the story level including the interactions of a user with the one or more stories presented to the user. The machine learning unit 155 of a preferred embodiment extracts features and attributes of the observable activities and converts those attributes and features into models and/or decisioning models. The models generated by the machine learning unit 155 are then used at input to instruct or modify the story generation process or other processes implemented by the intelligence system 100 and/or system 200.

The machine learning unit 155 of a preferred embodiment is operably couple to or in communication with a recording unit 156. The recording unit 156 is configured to capture all activities occurring at the story level and store the activity information in a database accessible to the machine learning unit 155. In some embodiments, the recording unit 156 captures the activities at the story level and communicates resulting activity information directly to the machine learning unit 155 for processing thereby.

Thus, the machine learning unit 155 of a preferred embodiment is able to access activity information and/or directly obtain activity information for the purposes of consuming the activity information and constructing algorithms (including data processing algorithms), generating predictions on data, constructing models, and the like that will be used in the data processing pipeline of the intelligence system 100.

In particular, the machine learning achieved by the machine learning unit 155 is applied to a number of different components of the intelligence system 100 and system 200. For instance, the machine learning that occurs at the story level is then applied to the processes associated with the detectors in detecting anomalies and outliers and also, at the story generating unit 161 to enhance or adjust the story generation process. Effectively, the application of the machine learning that occurs at the machine learning unit 155 is intended to enhance an overall process of the intelligence system 100 and system 200 of reducing all the received data streams from the plurality of data sources into a limited amount of useful information and insights (e.g., reducing 50,000 data inputs to 7 useable data series or inputs). Thus, machine learning enhances the data reduction process at various levels of the intelligence system 100 and system 200.

Additionally, and/or alternatively, the machine learning unit 155 of a preferred embodiment is applied to identify stories in which a user has a relatively high probability of interest such that the user would be likely to select and/or explore the content of the stories. Thus, a significant responsibility of the machine learning unit 155 is to extract features and attributes of activities of the user at the story level and/or additionally, extract features and attributes of the user profile (or user profiles) to identify a data processing model based on the extracted features and attributes of the activities of the user. One of the purposes of the data processing model identified by the machine learning unit 155 is for enhancing the probability of interest that a user may have in one or more stories generated by the system. The greater the probability of interest that a user is interested in a story, the more likely the user will select and/or interact with a story generated by the system or otherwise, determine find the story meaningful. The data processing model, therefore, takes into account insightful features and attributes of the user's activities at the story level to enhance the processes involved in generating the one or more stories presented to a user. For instance, the data processing model may be applied to the anomaly detection processes to enhance the one or more technical analysis processes applied to a data set used in determining anomalies that the user has an interest in or in general terms, issues or data content that the user cares about.

In a preferred embodiment, the story generator 161 determines a probability of interest score or factor for each story that is generated. This probability of interest score or factor, as mentioned previously, relates to the likelihood that a user would find a story interesting such that the user would be inclined to interact with the story. The story generator 161 preferably identifies those generated stories with a high probability of interest and adds them to a story queue or otherwise, presents the stories directly to the user. The stories having a low probability of interest are eliminated by the story generator or alternatively, some of the stories having a low probability of interest is compiled into a story having a high probability of interest so that the user has the option to select and/or explore the stories having a low probability of interest, if desired. The probability of interest in a story may be determined in a number of different manners including based on one or more predetermined thresholds, dynamic thresholds, interest algorithms, a combination thereof, and/or the like. The probability of interest factor or score may be compared to one of these mechanics to determine whether the probability of interest is high, low, or otherwise.

Figure 2:
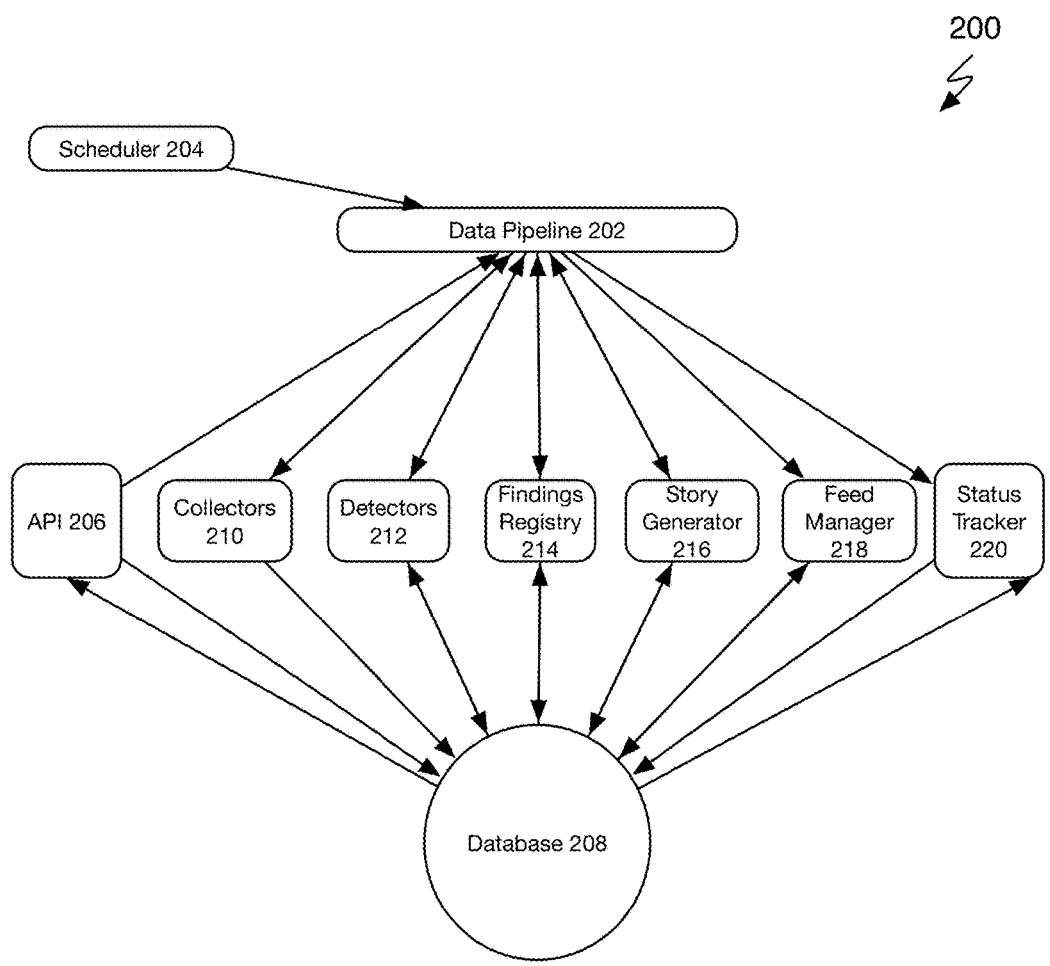
FIG. 2 is an alternative schematic representation of a system of a preferred embodiment of the present application.

As shown in FIG. 2, a schematic representative of additional, and/or alternative architecture of a system 200 for implementing a big data platform for identifying intelligence information and inferring insights is illustrated. In some embodiments, the system 200 is configured to work in conjunction or cooperatively with intelligence system 100 and/or perform one or more of the various functions and/or operations of the systems or components in intelligence system 100. Additionally, and/or alternatively, the system 200 may be used in lieu of one or more systems or components of intelligence system 100.

System 200 of a preferred embodiment includes a data pipeline 202, a scheduler 204, an API 206, a database 208, collectors 210, detectors 212, findings registry 214, a story generator 216, a feed manager 218, and a status tracker 220. Additionally, and/or alternatively, one or more of the components of the system 200 may be combined into a single component that is able to perform the associated operations of the combined components. For instance, in some embodiments, the detectors 212 and the findings registry 214 may be a single component that performs the functionality of both the detectors 212 and the findings registry 214. In a preferred embodiment of the present application, the components 202-220 of system 200 are communicatively or operatively coupled via a network such that each of the components can communicate and transmit information and/or data between each other and other external devices.

The data pipeline 202 of system 200 preferably is a conduit or broker manages large data streams and interfaces between large number of components to manage the transmission of data among the components of the system 200. The data pipeline 202 is preferably based on Kafka, a data broker that can handle hundreds of megabytes of reads and writes per seconds from thousands of clients. Thus, the data pipeline 202 is specifically designed to allow a single cluster to serve as the central backbone for a large entity. The data pipeline 202 is able to elastically and transparently expand without downtime and further, partition data streams and spread them over a cluster of machines to allow data streams larger than the capability of any single machine to be processed. Accordingly, the data pipeline 202 is able to coordinate and work cooperatively communicate with each of the components of system 200 to transmit very large amounts of data back and forth.

The scheduler 204 of system 200 preferably schedules one or more tasks to be performed by the data pipeline 202 and similarly, is used to control one or more operations and/or functions of data pipeline 202.

The API 206 of a preferred embodiments provides routines and protocols for interfacing with the system 200. For instance, via API 206 (e.g., application program interface) allows a user to interact with and/or control one or more operations of the entire system 200. Accordingly, using API 206 a user can interact with the data pipeline 202 and the database 208 to control the flow of data in the data pipeline 202 and also, to query or otherwise access data within the database 208. The database 208 of a preferred embodiment stores data, detections, findings, stories, feeds, and status information from the various components of the system 200.

The collectors 210 are preferably used to collect one or more portions of data from the data pipeline 202 and communicate that data to the database 208 and also, communicate data from the database 208 to the data pipeline 202. The data communicated from the collectors 210 to the data pipelines 202, in some embodiments, are redistributed to one or more other components of the system 200 for the purpose of further processing.

The detectors 212 of system 200 are, preferably, used to detect anomalies, outliers, and recurring patterns within data. The detectors 212 is able to communicate to and between the data pipeline 202 and database 208.

The findings registry 214 identifies insights and inferences from the data. The findings registry is also able to identify one or more decisions or conclusions about or relating to data which has been processed in system 200. In this way, these findings by findings registry 214 can be used by the story generator 216 to compile or identify one or more stories about the data.

The feed manager 218 of system 200 of a preferred embodiment is configured to control the feed of stories to one or more client user interfaces. For instance, the feed manager 218 controls the number of stories presented via a user interface, an order of the stories in a news feed of a user interface, the recurrence of stories in the news feed, a length of time of presenting each of the one or more stories in a news feed, and the like. Thus, the feed manager 218 automatically, based on one or more predetermined parameters, machine learning by the system 200, and/or user preferences, controls the content and operation of a news feed. With respect to machine learning by the system 200, based on the activity and interaction of a user with one or more stories, the system 200 machine learns new parameters to thereby modify the control parameters of the feed manager 218. For instance, the feed manager 218 of an exemplary embodiment controls a news feed of a user interface to display the first three (3) stories in a news feed for two (2) minutes. However, based on recorded activity and interaction of a user with prior news feed stories at a top of a news feed, the system 200 machine learns that a user typically interactions with the first (3) news feeds at the top of the news feed for a minimum of four (4) minutes. In this regard, a machine learning unit, preferably, could cause the system 200 to modify the control parameters of the feed manager 218 to change from the two-minute display time of the first three stories to a four-minute display time of the first three stories. It will be understood that the above is just an example of one manner in which the feed manager 218 can interact with a machine learning unit of system 200 and therefore, should not be limited by this example.

The status tracker 220 of a preferred embodiment of system 220 tracks the status of the one or more stories provided to a news feed of a user interface. Preferably, the status tracker is able to track user activity related to the one or more stories and the overall status of each of the one or more stories. For instance, the status tracker 220 can track whether a user selects one or more of the stories in the feed (e.g., whether a story has been opened or closed), how long a story has been opened by a user, whether or not other related stories within a selected story have been selected, a position of the story on the user's user interface (e.g., at a top, bottom, left, right, etc. of user display), whether a user performs additional analysis of the elements within a story and the type(s) of analysis performed by the user, and the like. It shall be understood that these are simply examples of the activity that the status tracker 220 can track in relation to the one or more stories provided in a news feed and therefore, should not be limited thereto.

Figure 4:
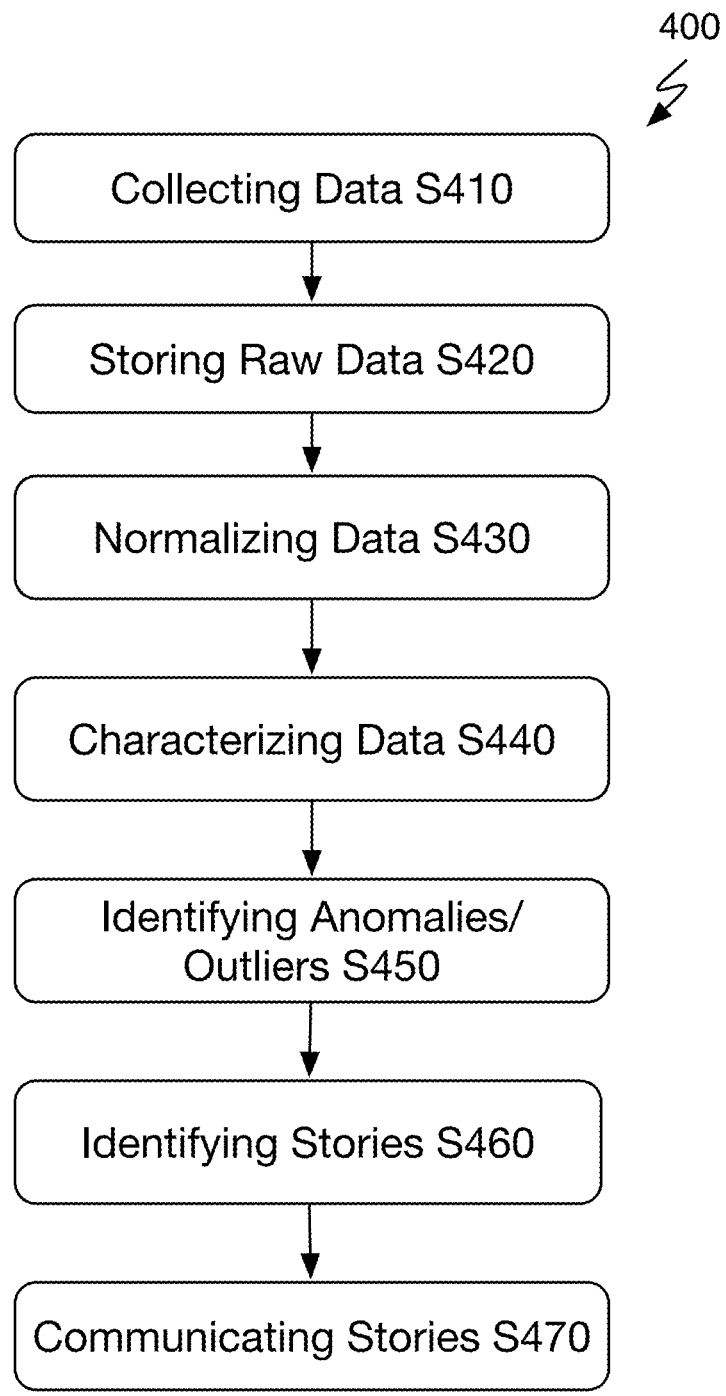
FIG. 4 is a process flow of a method of a preferred embodiment of the present application.

As shown in FIG. 4, a process flow of a method 400 for implementing identifying intelligence information and insights of a preferred embodiment includes collecting data at a data aggregator S410, storing the collected data as raw data S420, normalizing the data S430, characterizing the data S440, identifying anomalies and/or outliers in the data S450, identifying one or more story topics S460, and communicating the one or more story topics to a database S470.

Figure 5:
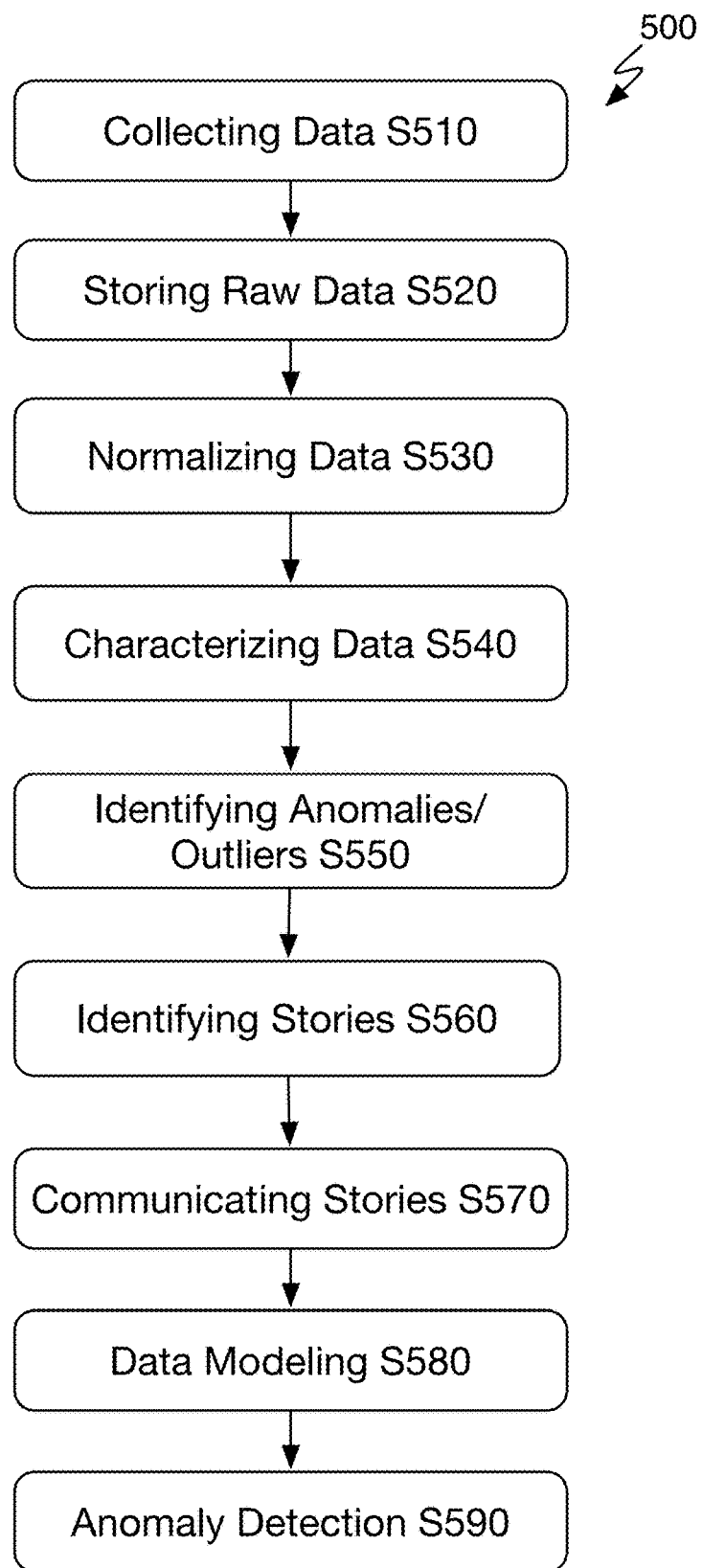
FIG. 5 is schematic representation of a variation of the method of FIG. 4.

The method 400 functions to allow for the aggregation of data from multiple data sources and without necessarily determining the identities of users that create the data or are otherwise, associated with the data, the method 400 leverages a big data platform and novel techniques of operating the big data platform to determine intelligence information and infer various insights therefrom. As shown in FIG. 5, method 500 is a schematic representation of a more detailed process flow and variation of the method 400. The method 500 includes additional data processing steps, such as a data modeling step S580 and an anomaly detection step S590, which together allow for various models of the data to be generated for analysis and anomaly detection.

At step S410, data from a number of data sources are aggregated at a data aggregator and collector of a cloud-based big data platform. The data sources of a preferred embodiment include one or more of applications, services, servers, databases, and the like which are operated by or otherwise, subscribed to by the entity. The data sources include sources of data associated with the operations of the entity. The plurality of data sources of a preferred embodiment are disparate and distinct, however, it shall be understood that in some instances one or more of the data sources may involve related vendors of data or similarly, related sources of data, such that while the data sources may be separate or distinct an overall entity (e.g., data vendor or the like) managing the data sources may be the same or related to another entity associated with the plurality of data sources.

Additionally, and/or alternatively, during step S410, data points from the data aggregated from each of the plurality of data sources are joined together based on time thereby forming a temporal joint of data points or a time knot of data points. Thus, in lieu of or in addition to joining data points on another basis (e.g., user identity, etc.) the data points are joined according to a time associated with an occurrence of an event creating and/or associated with the generation of the data point(s). In a preferred embodiment, the data points are joined solely on the basis of time, which thereby simplifies the aggregation process moving forward into other processes of method 400, including normalization and data characterization.

The temporal joint or time knot formed between the data points of an exemplary embodiment are made between data points of the various data sources. Accordingly, data points from a first data source (ds1) and a second data source (ds2) may joined together solely on the basis of time. For example, 5 data points may be collected from ds1 and another data points may be collected from ds2. The 5 data points originating from ds1 include: $ds1_{t-1}$, $ds1_{t-4}$, $ds1_{t-6}$, $ds1_{t-11}$, and $ds1_{t-17}$ and the 5 data points originating from ds1 include: $ds2_{t-2}$, $ds2_{t-3}$, $ds2_{t-6}$, $ds2_{t-13}$, and $ds2_{t-17}$. In such example, the method 400 is used to identify or create a sequential temporal joint or simultaneous temporal joints of several of the data points from ds1 and ds2. The sequential temporal joint, in this example, would include $ds1_{t-1}$, $ds2_{t-2}$, $ds2_{t-3}$, and $ds1_{t-4}$ since these data points of ds1 and ds2 occur in a sequential and/or logical order without any breaks in time. The simultaneous temporal joints would include: first—$ds1_{t-6}$ and $ds2_{t-6}$ and second—$ds1_{t-17}$ and $ds2_{t-17}$. Based on the data points from ds1 and ds2, the method is implemented to create sequential temporal joint between the data points from ds1 and ds2 that include a combination of data points therefrom linked, associated, or strung together in a chronological time order. Further, the method is implemented to create simultaneous time joints between data points that occur at a same time from two distinct data sources ds1 and ds2. The data points forming the sequential temporal joint are stored in a storage device (e.g., a database or memory) in such a manner that each of the data points in the sequential temporal joint are associated and/or linked with each other. Similarly, the data points forming the simultaneous temporal joint are stored in a manner that links and/or associates each data point with each other. The linkage and/or association of the data points, in some embodiments, occurs prior to normalization of the data points. However, additionally, and/or alternatively, the temporal joint of the data points out of the plurality of data streams occurs after the data points are normalized and timestamps are added as meta data to each of the data points. Thus, a benefit to adding timestamps to the data points during normalization of the data points or at any other time is that the method and/or system processing the data points in the data streams can more readily identify which data points that should be joined in a temporal joint, either sequentially or simultaneously because a timestamp identifying a creation of the data point and/or identifying at a time at which an event occurred which triggered the creation of the data point is associated with the data point.

An additional technical benefit of the temporal joinder of data points from various data streams is that in the processing of data, especially, the number of data points characterized or analyzed together may be limited to data points defined in or otherwise, forming the temporal joint. Thus, at a data characterization step and/or a computation step (e.g., analysis) of processing the data, the temporal joint of the data reduces the complexity of the data processing required because not all of the data points from the data streams are processed together, but the temporal joints provide limited groups of data points that are characterized and/or computed together to determine meaningful insights therefrom.

It will be understood that a plurality of temporal joints of data points can be achieved including a plurality of sequential temporal joints and a plurality of simultaneous temporal joints or a combination thereof.

Additionally, and/or alternatively, when performing a temporal joining of data points from various data sources, the method 400 of a preferred embodiment limits a sequential length of a sequential temporal joint to a predetermined length or amount to thereby limit a number of data points included in the temporal joint. Likewise, the number of paired or grouped data points in simultaneous temporal joints, in some embodiments, are also limited to a predetermined pairing or grouping size. The predetermined restrictions on a size or length of a temporal joint optimizes the probability of usefulness of the temporal joint for the purpose of identifying intelligence information and/or useful insights. The predetermined restrictions, in some embodiments, are determined based on machine learning applied to the systems and method described herein. The machine learning in such embodiments identify optimal sizes or lengths for the temporal joints to, again, optimize the resulting intelligence information resulting from the temporal joints of data points.

While it is generally described that temporal joints and/or implicit joints based on time can be achieved at a data aggregator, such as described in step S410, it will be understood that temporal joining of data can be performed at various stages in the data processing. In fact, in an exemplary embodiment it is preferred to perform temporal joining of data only at or additionally at the story level (e.g., steps S460-470) when one or more stories are identified in the method 400. The benefits of such processing are described in more detail below.

After data is aggregated at step S410 and stored in step S420, a normalization process is applied to the raw data to transform the raw data into a standardized format at step S430. In a preferred embodiment, the normalization process includes a formatting process that requires metadata information describing each of the facets of the data points and/or data series to be added thereto. This metadata information applied to the raw data in the normalization process includes, but is not limited to, information about the data, such as a source or sources of the data, type of data, quality of the data, size of the data, and information about the collection process of the data. Additionally, and/or alternatively, data values are assigned to each data point of the data together with one or more timestamps identifying a time at which the data was created and/or a time stamp identifying at time at which an event occurred causing the generation the associated data. The one or more timestamps may also include a time at which the data was collected by the by the intelligence system 100 or system 200.

Additionally, and/or alternatively, at step S430, each group of temporally joined data is normalized to standard identifying information about the temporal joint that includes, but is not limited to, meta data identifying a type of temporal joint, a size or length of the temporal joint, and the like.

At step S440, once the normalization process is complete or in response to the completion of the normalization process, various analysis processes are applied to the normalized data to identify characteristics of the normalized data including, but not limited to, identifying trends in the normalized data, cyclicalities or seasonalities in the data, outliers and anomalies in the data, and various statistical properties of the data. The various analysis processes of a preferred embodiment are based on one or more applied predetermined technical analysis algorithms, predetermined or dynamic queries, a predetermined or dynamic analysis processes, and/or a combination thereof.

The predetermined technical analysis algorithms, predetermined queries, and predetermined analysis processes, in some embodiments, are preprogrammed and stored in a computer-executable medium or storage device that is executed by a system implementing method 400. Additionally, as shown in FIG. 5, the method 500 includes a machine learning component which provides periodic or continuous feedback into the process flow of method 500. In this way, the predetermined technical analysis algorithms, predetermined queries, and predetermined analysis processes are subject to periodic or continuous adjustment based on the machine learned information and/or feedback. That is, while the technical analysis algorithms, queries, and analysis processes may be predetermined, these various analysis processes are subject to adjustment based on the machined learned feedback or information thereby resulting in new technical analysis algorithms, queries, and analysis processes that are dynamic because they are continually evolving and changing thereby resulting in evolving technical analysis algorithms, evolving queries, and evolving analysis processes that may then be applied against the data to identify data characteristics thereof. While the machine learning is generally described with respect to method 500, it shall be understood that the machine learning is equally applicable to the process flow of method 400 and therefore, the identified models, patterns, and/or algorithms determines during machine learning could be applied to one or more of the steps in method 400 to adjust one or more processes therein.

Additionally, and/or alternatively, subsequent to the normalization of the data, the normalized data, in some embodiments, are group together in a plurality of data series. Each of the plurality of data series of a preferred embodiment includes one or more groups of normalized data where the one or more groups of normalized data in each data series are grouped together based on timestamp information. For instance, one group of data in a data series may include data $D_{t1}, D_{t2}, D_{t3} \ldots D_{tn}$ where t defines an increment of time and t1-t3 are consecutive increments of time through tn. Additionally, and/or alternatively, grouping of temporally joined data is also performed.

Figure 6:
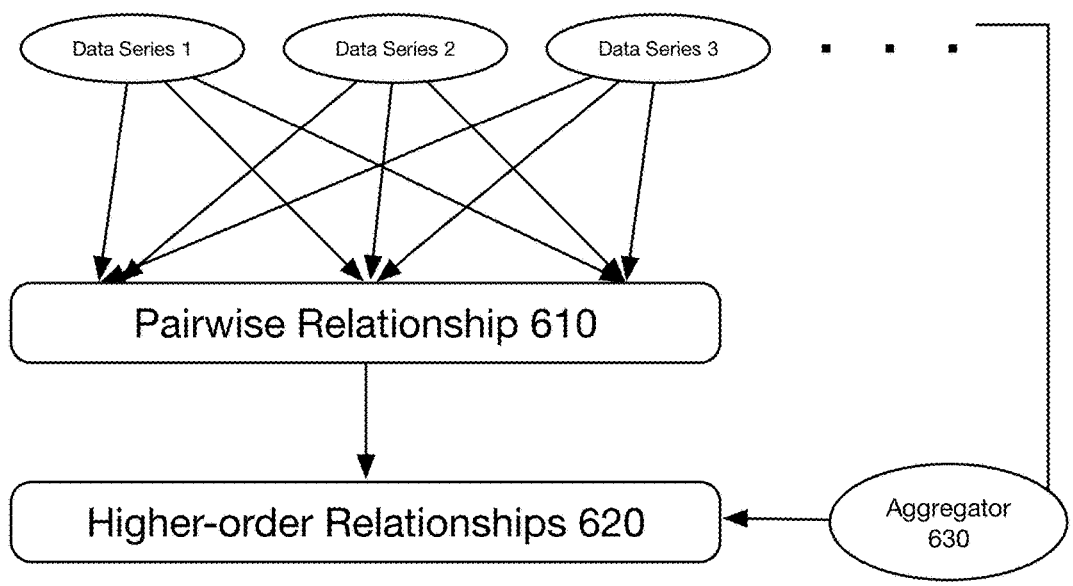
FIG. 6 is a schematic representation of a method of a preferred embodiment of the present application.

Additionally, and/or alternatively, the predetermined analysis process applied to a plurality of data series includes a pairwise analysis to identify pairwise relationships between pairs of data series of the plurality of data series, as shown in FIG. 6. The schematic 600 of FIG. 6 includes Data Series 1, Data Series 2, and Data Series 3 where each of the data series comprises a characterized data set including a plurality of data points that have been previously characterized by the intelligence system 100 and/or system 200. In the schematic 600, varying combinations of data series pairs are established between each of the Data Series 1-3. As a result, pairwise relationships between the Data Series 1-3 are identified at a pairwise relationship component 610. Once pairwise relationships are identified in a pairwise analysis at the pairwise relationship component 610, an additional higher-order relationship analysis is applied to each of the paired data series to identify higher-order relationships at a higher-order relationship component 620. Additionally, and/or alternatively, the pairwise analysis process may be bypassed and the plurality of data series are aggregated at the aggregator 630 and transmitted directly to the higher-order relationship component 620 such that only a higher-order analysis is applied directly to all of the data series in order to identify higher-order relationships amongst and between the plurality of data series.

The identification of pairwise relationships and/or the higher-order relationships are used in a preferred embodiment to identify intelligence from the plurality of data series. The identification of a higher-order relationship, in some embodiments, between data points indicates an identifiable relationship between data points such that a relationship description is derivable therefrom.

Step S450 of a preferred embodiment is performed contemporaneous with or immediately following the data characterization at S440. Step S450 involves identifying anomalous characteristics of the data or outliers in the data. Thus, step S450 of a preferred embodiment includes applying various statistical analysis to determine statistically significant deviations or other deviations in the data and/or applying predetermined or dynamic thresholds to the data to identify data indicating an anomaly or outlier.

Additionally, and/or alternatively in step S450, any identified anomalous characteristics or outliers of the data are determined to be prospective elements in one or more story topics or headlines. These story topics or headlines relate to subject matter with a considerable to high probability of being of interest to an entity, and namely, a user operating within the entity which may observe the identified anomalous characteristics or outliers.

At step S460 one or more or a plurality of stories are identified or generated. The stories include content developed and/or formulated based on one or more data sets or data series that have been processed at steps S430 and S440 and have, therefore, been normalized and characterized. Thus, a story, in some embodiments, includes one or more statements describing the data set(s) that is the basis for the story and also, one or more models and/or characterizations (e.g., graphs or the like) of the data set(s). The statement describing the data set(s) are automatically formulated according to predetermined rules and/or special algorithms designed to determine and/or formulate a written description that reasonably describes the data sets which forms the basis of the story. It shall be understood that the entire content of a story may be formulated automatically in step S460, which includes the written description and other illustrations or items within a story (such as graphical illustrations or the like). The formulated content of the stories may be based on one or more of pieces of information obtained during the aggregation process, the normalization process, the data characterization processes, the detection processes, the story generation process, and/or any of the other processes described herein. For instance, the content of a story of an exemplary embodiment is formulated based on outputs of the data characterization processes in combination with intelligence and insights derived from a specific data set. Accordingly, in the identification of the one or more stories in S460, related data points are grouped into data set(s) to form the basis of a story. Alternatively, predetermined and/or previously grouped data sets, which were grouped earlier in method 400 (e.g., grouped immediately after normalization or aggregation processes), are converted into stories.

In a preferred embodiment, the identification of stories in step S460 occurs after the normalization process described in step S430 and in a further preferred embodiment, after both the normalization process of S430 and the data characterization processes described in step S440, but before step S450 or contemporaneous with step S450. This is because the story identification process of S460 of an exemplary embodiment can also involve anomaly and/or outlier detection similar to those described in step S450. However, in such exemplary embodiment, the anomaly detection and/or outlier detection processes are applied to the stories, themselves, after the stories are generated. Thus, the anomaly and/or outlier detection processes at the story level are used to examine already generated stories to identify anomalies and/or outliers within the content of the stories.

It should be noted that in a preferred embodiment more than anomalies and/or outliers are identified in the detection processes applied to the generated stories. In such embodiment, similarity functions and/or pattern detection functions are also applied to the generated stories. Accordingly, after each of the stories are identified or generated, in step S460, each of the stories is analyzed to identify patterns or trends in the data sets and/or characterizations of the data sets and/or patterns or trends in the content (e.g., the written description of the data sets). Contemporaneously and/or additionally, one or more similarity functions are applied to the stories which generally compares one or more facets and/or one or more dimensions of the stories to each other and specifically, the similarity functions compares the identified patterns and/or trends of the stories to each other to thereby determine whether two or more of the stories should be joined together due to similarities and/or to determine whether or not a story should be presented to a user.

Additionally, and/or alternatively, in step S460, a temporal joinder of two or more stories is performed at the story generation level. A temporal joinder of two or more stories of a preferred embodiment is formed on the basis of time and at least one other parameter or metric. As discussed with respect to step S410, a temporal joinder of data points or data series may be achieved on the basis of time, such that data points or the like to be joined may be joined if the data points occurred or an event associated with the data points occurred at a same time (e.g., simultaneously) or in a logical time order (e.g., sequentially). The temporal joinder at the story generation level is similar in that the two or more stories may be joined based on temporal factors including whether data sets forming the basis of the stories occurred simultaneously or sequential. In a preferred embodiment, however, the temporal joinder of two or more stories requires a temporal factor (e.g., simultaneous or sequential occurrences) and at least another non-temporal factor, parameter, and/or metric. The at least another non-temporal factor(s) may be any other factor, such as a factor of similarity between at least two stories that increases the likelihood that the at least two stories are sufficiently related such that they should be joined together. Sufficiently related, in some embodiments, means that there is a more likely than not (e.g., greater than 50%, etc.) probability that the at least two or more stories are related. Additionally, and/or alternatively, sufficiently related means that a probability of relationship between the at least two or more stories exceeds a predetermined threshold. Additionally, non-temporal factors include, but is not limited to, (i) similarities in patterns, trends, anomalies, and/or outliers and (ii) identified correlations (e.g., positive or negative correlations) between the two more stories and the like.

Once at least one non-temporal factor is set in addition to a temporal factor, a temporal joinder of a preferred embodiment is achieved when there is a temporal alignment in the two or more stories and an identified relationship in the at least one non-temporal factor. For example, a temporal joinder of two stories may be achieved where the data sets forming the basis for the two stories occurred in a similar window of time and a similar trend in the data sets are apparent. A temporal joinder of two stories can also be achieved where the data sets forming the basis for the two stories occurred in a correlated or logical sequence and not necessarily in a similar or overlapping window of time.

It shall be noted that while the temporal factor in a temporal joinder of two or more stories is typically judged based on either a sequential or a simultaneous occurrence of data or event, the basis for a temporal joinder may also include similarities in windows of time. Thus, in the temporal joinder analysis a comparison of windows of time associated with the stories is performed. For example, the data set of a first story may have been generated or associated with an event occurring at Month 2, Days 14-17 (window 1) and the data set of a second story may have been generated or associated with an event occurring at Month 2, Days 15-17 (window 2). In such an example, when comparing window 1 and window 2 of the first and second stories, respectively, it is determined that there is a significant overlap between windows 1 and 2, such that the data sets 1 and 2 should be considered together. As you can see from this example, the overlap over similarity in windows may be substantially direct since the three days of window 2 overlap with the majority of the days of window 1. It shall be noted that window 1 and window 2 may occur in the same year or different years, but still may be used for the purposes of identifying a temporal joinder. In some instances, it is helpful to use overlapping windows which occur in different years or the like to perform year-over-year analyses or the like.

Additionally, and/or alternatively, stories may be joined together semantically. In several of the generated stories may exist logical relationships, which may be observed or otherwise, extracted or extrapolated from the stories. These identified logical relationships may similarly and/or additionally serve as the basis for joining stories together. For instance, it may be known from observation that story A logically occurs prior to story B, the system identifying this logical relationship joins story A and story B in a semantic joinder additionally and/or alternatively to a temporal joinder.

There are several technical benefits achieved by computing against the data or data sets only at the story generation level or later in the data processing pipeline. In general, computing against the data means analyzing the data in some manner to identify attributes and/or characteristics which indicate relationships between disparate sets of data or data points or otherwise, identifies intelligence and/or insights based on one or more data sets. A first technical benefit is that by computing against the generated stories at the story generation level and not before, allows for parallel processing of data sets or data series at the data normalization and data characterization steps, which results in a tremendously improved throughput efficiency. Another technical advantage is that by computing against the data only at the story generation level or later, more information about the data or data sets has been provided to the intelligence system following the normalization and data characterization processes and as such, the system implementing method 400 can generate the stories with more information and insight about the data sets, which results in more or fewer temporal or other joints of data sets and/or stories. This can be a significant advantage because in the processing of thousands of data sets in the intelligence system an objective is to reduce the large data sets via the data characterization and detection processes and especially, at the story generation level to an amount that is consumable by a user on a periodic (e.g., daily basis). Thus, having more information about the data sets at the story level, redundant stories can be eliminated and related stories can be joined together thereby reducing the amount of data that is eventually communicated to a user or via a feed or the like.

Additionally, and/or alternatively, the one or more stories are communicated to a database.

Referring now to FIG. 5, the method 500 includes the steps S510 to S580. Steps S510 to S560 are substantially similar to steps S410 to S460 of method 400. The method 500, however, includes two additional processing steps, namely, steps S570 and S580.

According to step S570 of the method 500, after the raw data is converted into normalized data, a modeler engine transforms the normalized data into one or more of various models. The various models of a preferred embodiment include, but is not limited to, graphs, trend lines, and/or various visual illustrations of the normalized data. The various models, in some embodiments, are used in the characterization of the normalized data. Thus, converting the normalized data into comprehensible information that can be processed and/or interpreted using or more detectors applied in the detection step S580.

As mentioned above, step S580 includes using one or more detectors to perform detections within the normalized data and more specifically, a detection within the various models of the normalized data of anomalies and outliers. The detectors of a preferred embodiment include one or more computer processing units that execute specifically designed computer code for detecting anomalies in data and in some embodiments, anomalies and outliers in the models and illustrations generated by the modeler.

In step S580, a number of analysis techniques are applied to the normalized data and/or various models to detect the anomalies and outliers therein and also, filter out data and/or models that have an insignificant to low probability of interest to an entity or a user within the entity who would evaluate such information. Thus, a combination of anomaly/outlier detection and data filtering is performed at step S580 to identify data points of interest and eliminate other data points having a low probability of interest to an entity. The analysis techniques applied to the normalized data and/or models of the data in step S580, in some embodiments, are similar to those applied in step S450 of the method 400, but also include additional analysis techniques specifically designed to be applied to the various models of the normalized data. For instance, an additional analysis technique applied in step S580 includes filtering data at a signal level. In such instance, in one or more of the models identified in the method 500, data points in a data series when mapped against time form an observable signal, which can then be analyzed for anomalies/outliers and/or significance with respect to a level of interest associated with the data. This assumes that each of the data points in the data series has an observed and/or assigned value, which can be mapped along a y-axis of a two-dimensional (x-y) coordinate system and a timestamp value or other time value that can be mapped against the x-axis.

Continuing with this example, when mapping data points in a data series along an x-y coordinate system, as discussed above, the resulting mapping can be illustrated as an oscillating wave or signal. The one or more filtering and analysis techniques provided in step S580 are preferably applied to the oscillating wave or signal to filter the signal. The filtering at step S580 of a preferred embodiment is applied to a plurality of oscillating waves and signals generated based on data points in order to identify which of the waves and signals: should be processed further, include data points of interest, should be eliminated from further analysis and processing, and the like.

Additionally, and/or alternatively, the filtering techniques at step S580 preferably include applying one or more thresholds to signal of one or more data sets. The one or more filtering threshold are preferably applied along at least one dimension of a signal acting as an upper and/or lower limit, such that data points exceeding the upper and/or lower threshold limits are flagged for additional consideration and/or processing. An additional filtering technique of exemplary embodiment includes applying signals generated based on past or historical data points against data points or a model of current data points being processed. The comparison of the signal generated from past data points and the signal of the current data points can be used to identify if any significant and/or meaningful variances occurred in the current data points that should be flagged for additional consideration and/or analysis.

Thus, the filtering at step S580 is used for a number of purposes including diminishing the number of data points within the data processing pipeline to a smaller, meaningful amount that can be used to generate stories or for other purposes, such as for enhanced analysis within the data processing pipeline or outside of the data processing pipeline.

Figure 7:
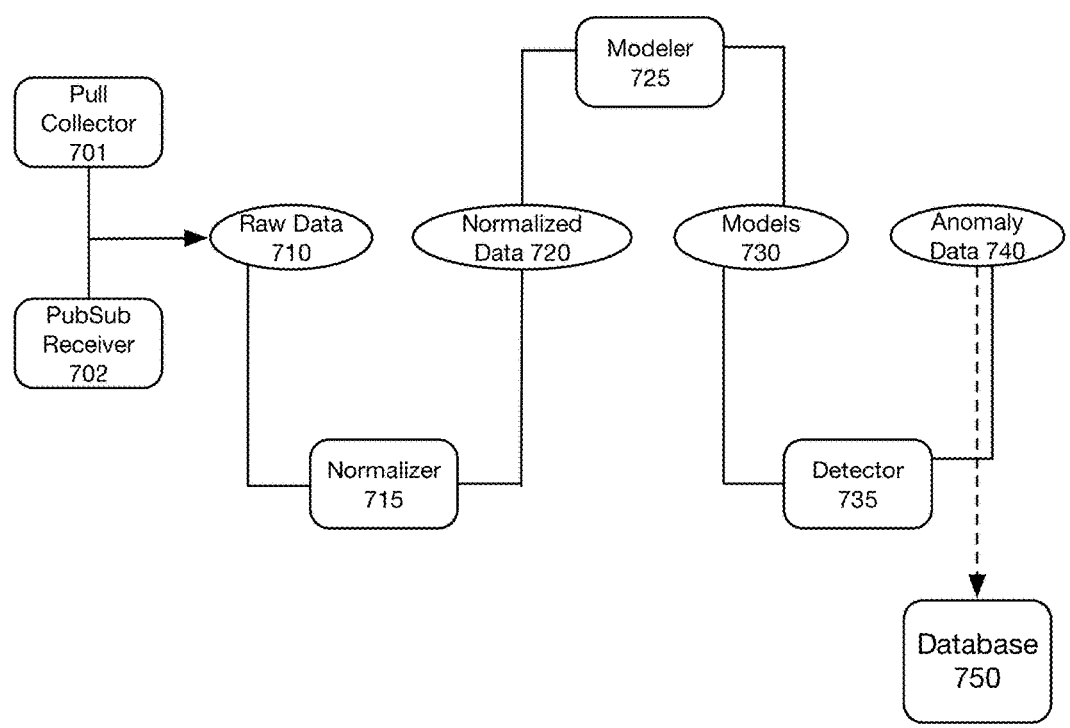
FIGS. 7, 7A, and 7B illustrate a schematic representation of a system and components thereof of preferred embodiments of the present application.

FIG. 7 illustrates a schematic representation of an architecture of a system 700 for implementing the method 400 and the method 500. It will be understood by a person of ordinary skill in that art that intelligence system 100 of FIG. 1 and any other system described herein can be used additionally, and/or alternatively to implement one or more steps of the process flows of method 400 and method 500 and any of the processes and methods described herein. System 700 includes a pull collector 701, pubsub receiver 702, raw data datastore 710, normalizer 715, normalized data datastore 720, modeler 725, models datastore 730, detectors 735, anomaly data datastore 740, and a database 750.

The pull collector 701 and pubsub receiver 702 of a preferred embodiment are configured to collect data from a plurality of disparate sources. For instance, pull collector 701, in some embodiments, collects data from internal data sources of an entity, as well as from external data sources which may be service providers of the entity. The pubsub receiver 702, in some embodiments, collects global data available from various data sources in the public domain. In many cases, the global data collected by the pubsub receiver 702 is data that is not directly or indirectly generated by the operations of the entity. That is, the global data is data that is created or generated by others outside of the entity and does not result from the direct or indirect operations of the entity. The pubsub receiver 702, in some embodiments, can also subscribe to non-public data (e.g., customer specific) data for the purposes of collecting such data and providing the non-public data into the data processing system.

The raw data datastore is configured to store the raw data collected by the pull collector 701 and pubsub receiver 702. The raw data in the raw data datastore is accessible to the normalizer 715 to thereby convert the raw data into normalized data and also, transmit the normalized data to the normalized data datastore 720 for storage. The normalized data store 720 is accessible by the modeler 725 to thereby convert the normalized data stored in the normalized data datastore 720 into various models, which characterize the data. The modeler 725 is able to transmit the various models of the normalized data to the models datastore 730 for storage. The detector 735 is able to access the models datastore 730 to identify anomalies and/or outliers within the normalized data and models of the normalized data stored. The detector 735 also transmits the identified anomalies and/or outliers and related information (e.g., topics and headlines) to the anomaly data datastore 740. The anomaly data datastore 740 is able to transmit the identified anomalies, outliers, and related information to the database 750 and the database is able receive and store the data from the anomaly data datastore 740.

Figure 7A:
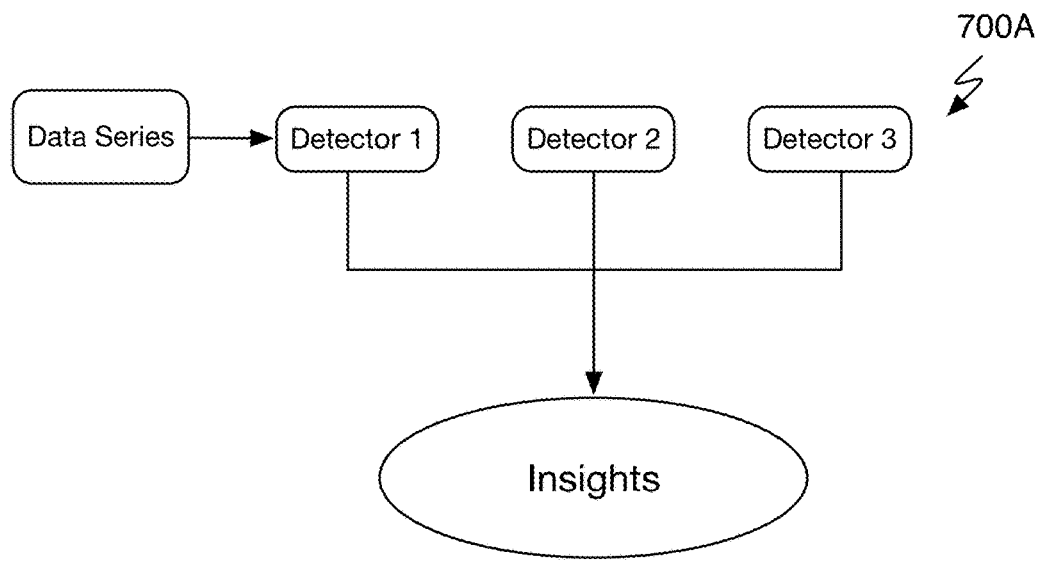
Figure 7B:
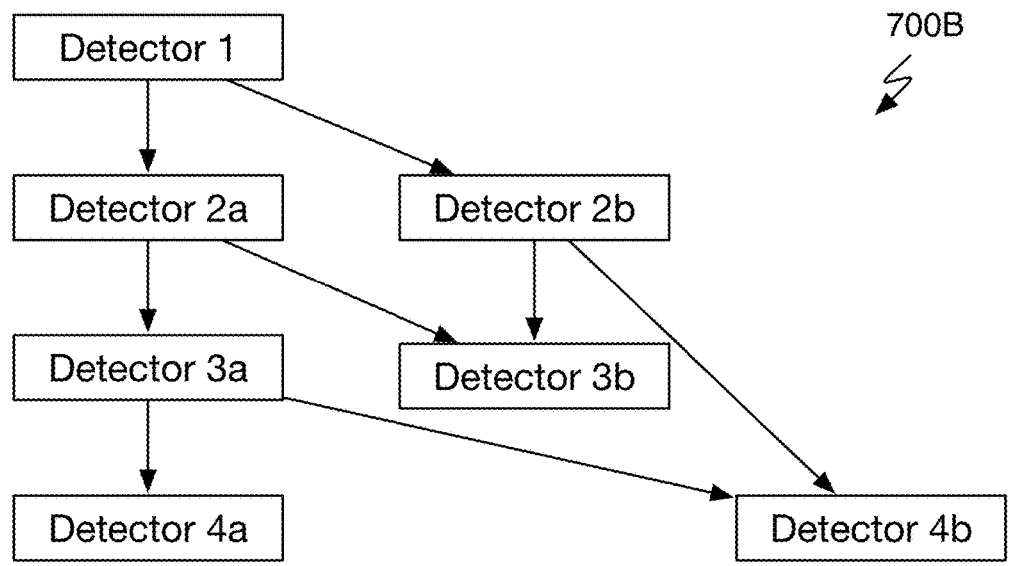

As shown in FIGS. 7A and 7B, the detector 740 can be configured to apply, at least, two different processes within representative schematics of 700A and 700B, respectively, for detecting anomalies and/or outliers in the normalized data and various models. The schematic 700A includes using chained detectors in identifying intelligence and insights. The schematic 700B includes using networked detectors.

It should be noted that while the detection schematics 700A and 700B are shown separately and are distinct from each other, schematics 700A and 700B may be combined to work jointly in identifying anomalies and outliers in the data. For instance, in some embodiments, the process 700A is first applied to the data (e.g., normalized data or other data) prior to the application of the process 700B or reversely, process 700B is first applied to the data and process 700A subsequently. Additionally, and/or alternatively, one of the processes, either process 700A or 700B, may be implemented based on or immediately (e.g., automatically) after the completion of the other process, either process 700A or 700B.

The networked detectors of schematic 700B of a preferred embodiment are used to detect anomalies in one or more data sets based on a non-sequential detection scheme that allows segments of a data set to be processed at different times in a non-sequential manner to achieve throughput efficiencies in the detection processes. For example, detector 1 may be an initial detector applied to a single data set and after the detection processes at detector 1, a portion of the data set may be transmitted to detector 2a and another segment of the data set to detector 2b for simultaneous detection processing. Thus, in this detection processing scheme it is not necessary that the entire data set be analyzed at detector 2a before detector 2b can be applied. By allowing portions of the initial data set to be segmented and processed at varying detectors in parallel, it allows for throughput efficiencies because it avoids unnecessarily processing an entire data set at every detector in a detection scheme thereby saving computer processing and time. This is a significant advantage over chained detection processing in which a data set in processed in series, as shown in schematic 700A.

Figure 9:
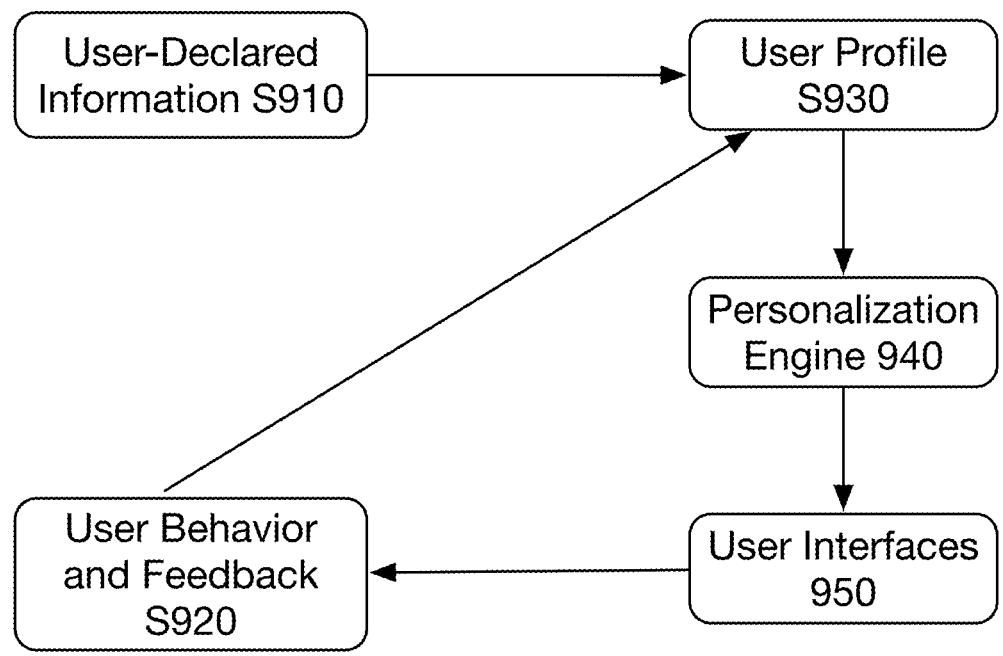
FIG. 9 is a schematic and process flow for building a user interface of a preferred embodiment of the present application.

In FIG. 9, a schematic representation and process flow 900 for building a user profile is illustrated. At step S910, user-declared information and is received from a user as input for generating a profile and personalized user interface for the user. The user-declared information may be received and/or collecting by one or more input components of the intelligence system 100 and/or system 200. User-declared information includes, but is not limited to, information about the user, such as user role in a company, user's company size, user's company's industry, user's gender, user's length of employment with company, user's topics of interest in the industry, information about customers of the user or user's company, and the like.

Additional user information in a preferred embodiment is also gathered and collected at step S920 which is in conjunction with the user-declared information to build and/or modify a user's profile. The additional user information includes user behavior and activity information collected while interacting with the intelligence system provided user interface, information, and one or more stories provided. The user behavior, activity, and feedback information, in some embodiments, is captured and provided using a machine learning unit, which produces learning models from the user's behavior, activity, and feedback information to improve the user profile building process. Accordingly, the additional user information gathered at step S920 is used to enhance a user's profile and associated user profile information.

Figure 10:
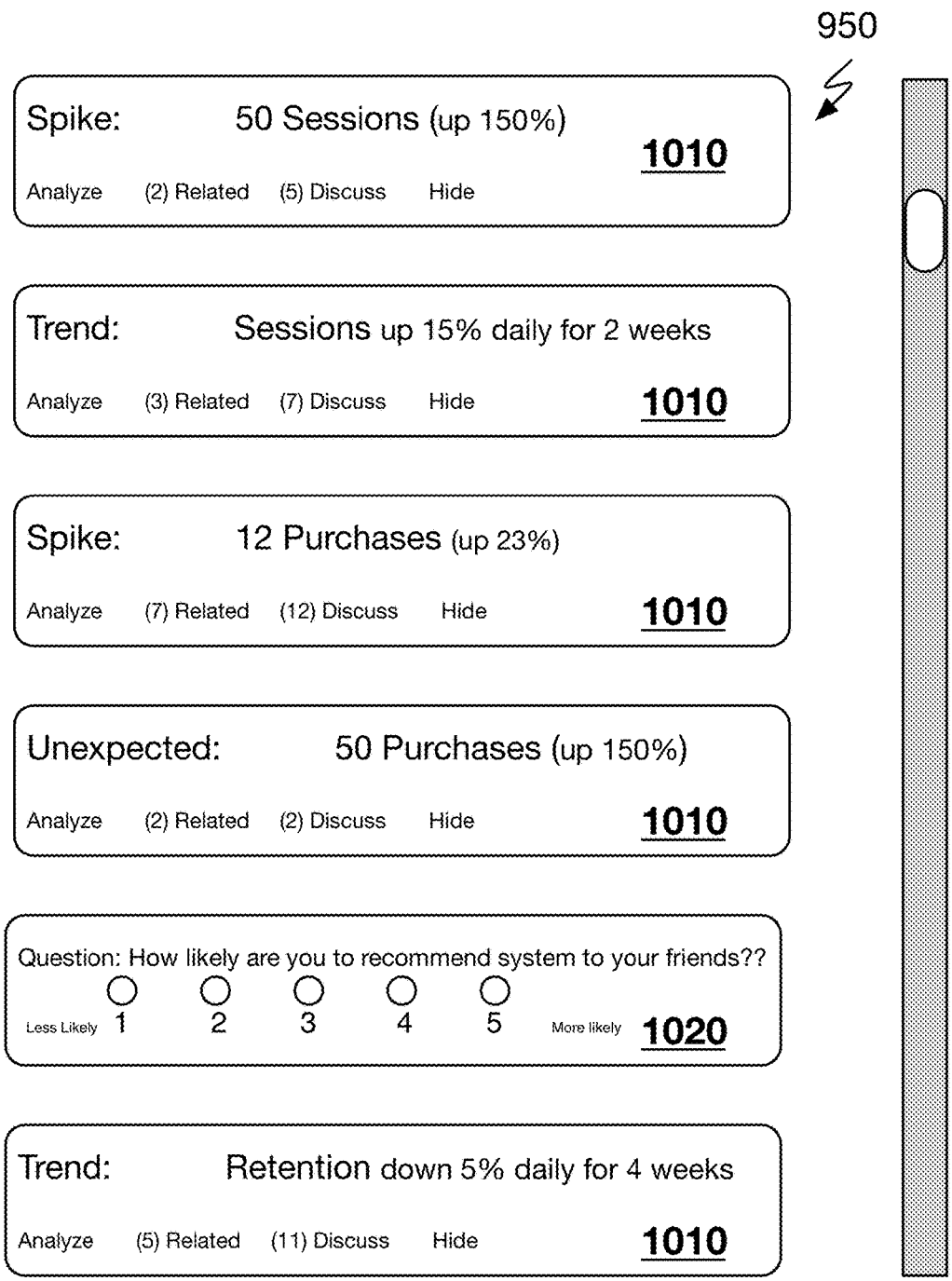
FIG. 10 illustrates an example user interface include a story feed in accordance with embodiments of the present application.
Figure 11A:
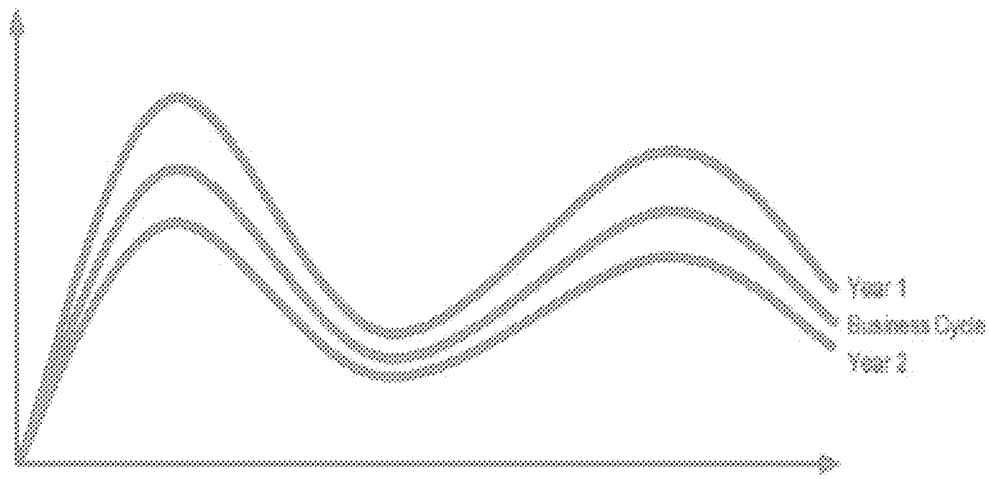
FIGS. 11A-11E illustrate example characterizations of data in accordance with embodiments of the present application.
Figure 11B:
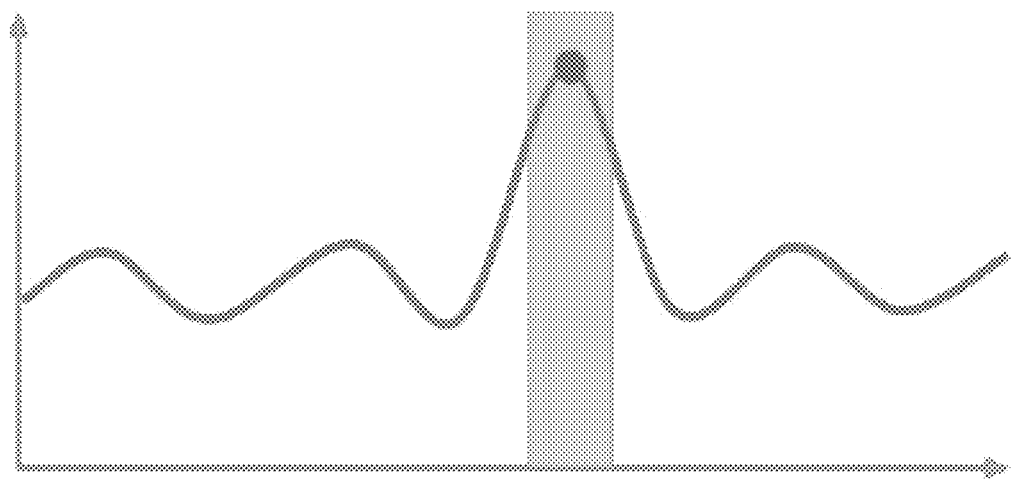
Figure 11C:
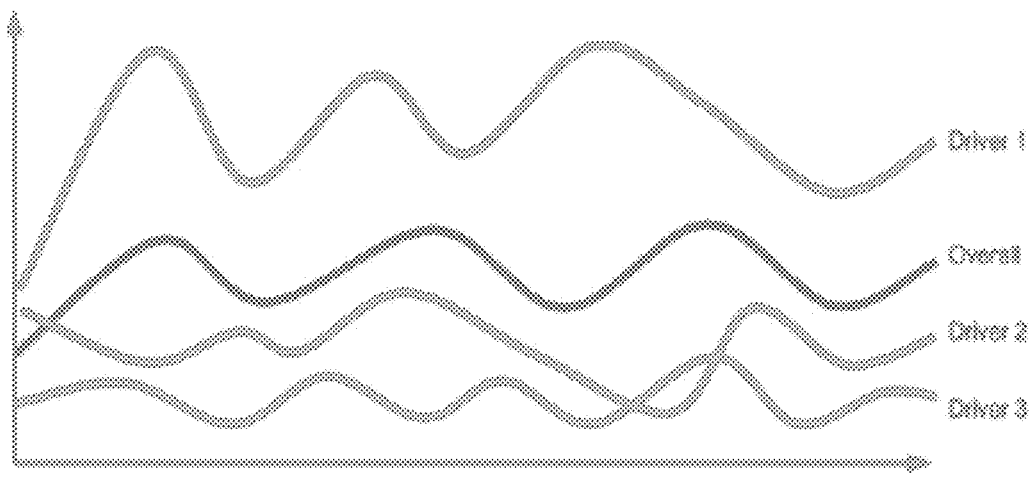
Figure 11D:
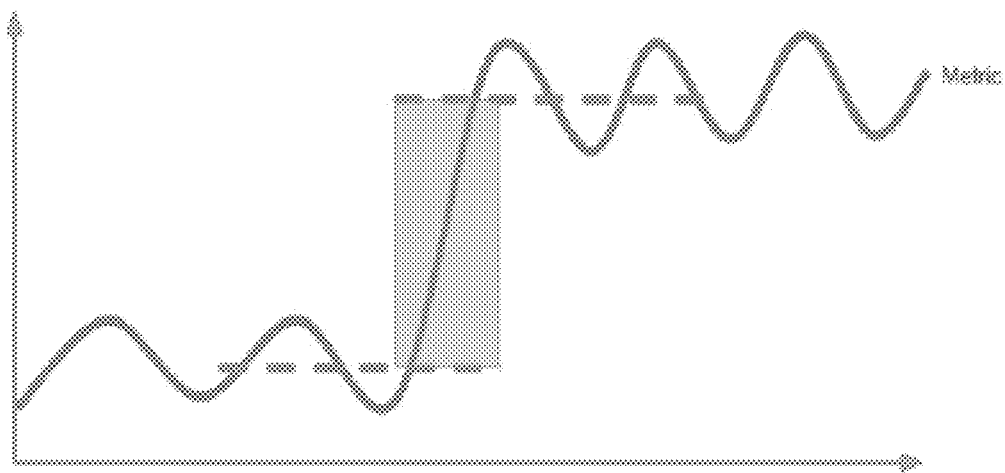
Figure 11E:
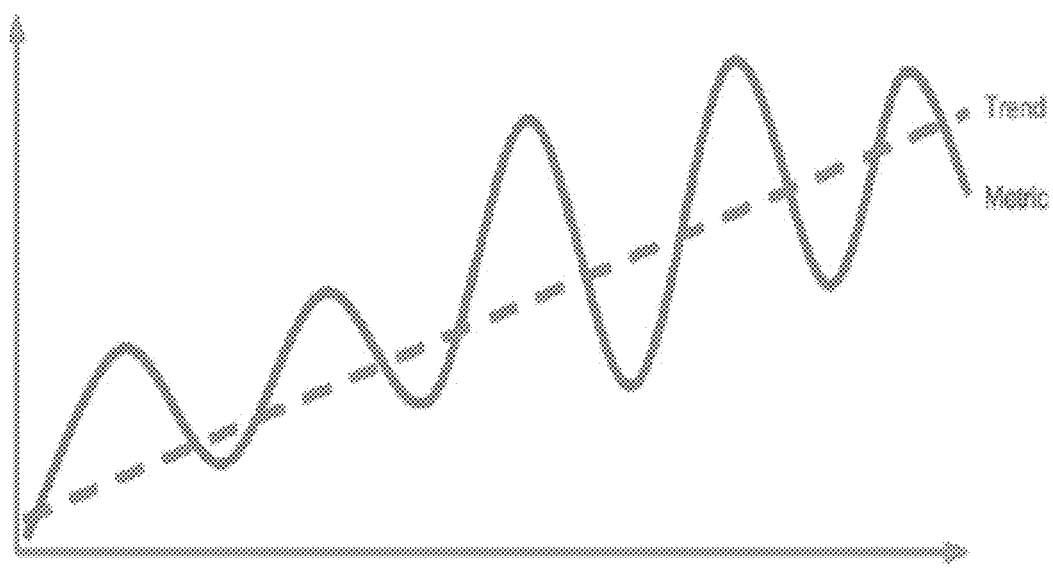

At step S930, the user's profile and user profile information are used at the personalization engine 940 to personalize and/or generate a user interface 950. As shown in FIG. 10, an example user interface 950 is illustrated which includes a combination of a plurality of stories 1010 and inquiries 1020. Once intelligence information (e.g., insights and the like) are generated and synthesized into stories by the intelligence system 100 and/or system 200, the one or more stories are presented in a feed format to the user via the user interface 950. The feed format enables efficient browsing of the one or more stories, as well as familiar mechanisms for exploring each story further (e.g., selecting a story to expand into the contents therein, etc.), interacting with other users about the one or more stories (e.g., commenting, sharing, and the like), and providing feedback to the system about the story (e.g., answering embedded queries, dismissing a story, liking a story, and the like). The feed to the user is available in a variety of form factors, including, but not limited to, a website, a mobile application, and a browser extension.

Additionally, and/or alternatively, machine learning unit 155 of a preferred embodiment extracts features and attributes of a user profile in order to generate user-specific models that allows any of the systems and/or methods described herein to further personalize the story generation and story presentation decision to a specific user. Thus, by allowing the machine learning unit 155 to also learn from specific user activity at the story level associated with a specific user profile, the machine learning unit 155 can develop role-based models that enhance the data characterization process and story generation process. In such embodiments, the models generated by the machine learning unit can further tailor a story feed to a specific role of the user, such as, for example, the roles of chief executive office (CEO), chief operating officer (COOs), and/or marketing director. In this way, the prevalent stories presented to these type of roles are those that CEOs, COOs, or marketing directors are more likely to be interested in.

Additionally, and/or alternatively, another form factor for presenting one or more stories to a user includes email reports provided periodically to the user. The email reports include a select number of the plurality of stories generated by the intelligence system 100 and/or system 200. A purpose of these email reports is to summarize the one or more stories and prompt further engagement in another form factor (e.g., system—provided user interface) for presenting the stories. For instance, in an email report summarizing one or more stories, the one or more stories are selectable, such that when selected by a user opens another form factor, such as a website with a fuller description of the selected story and related stories and content. Additionally, other channels for interacting with the intelligence system 100 and/or system 200 include extension to other communication and organization tools (e.g., messaging services, project management and prioritization tools, push notifications to mobile device, and the like).

Additionally, and/or alternatively, at the user interface 950, there are provided tools, filters, and user preferences that allow the user to customize their experience with the user interface and the type and form of information presented. For instance, if the user has a preference relating to a specific topic, the user can adjust the user interface to always recognize stories and related content and move that information to the top of the feed of the UI.

The methods of the preferred embodiment and variations thereof can be embodied and/or implemented at least in part as a machine configured to receive a computer-readable medium storing computer-readable instructions. The instructions are preferably executed by computer-executable components preferably integrated with an intelligence system for identifying intelligence, insights, and providing a news feed. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system that implements a data processing platform for identifying entity intelligence and insights based on data from a plurality of data sources, the system comprising:
   one or more computer processors; and
   a data processing platform implemented via the one or more computer processors that, upon executing computer-executable instructions, function as:
   a data aggregation unit that receives, over a network, a plurality of data streams from a plurality of remote data sources;
   a normalizing unit that normalizes each data point of a plurality of data points of the plurality of data streams by associating said each data point of the plurality of data points with meta data information;
   a data characterization unit that:
      (i) analyzes the normalized data points and associated meta data information to identify statistical attributes of the normalized data points, and
      (ii) applies one or more anomaly detection schemes to identify one or more anomalies and one or more outliers of the normalized data points;
   an intelligence unit that:
      (iii) identifies intelligence information and insights by synthesizing (a) the statistical attributes of the normalized data points and (b) the identified one or more anomalies and one or more outliers of the normalized data points,
      (iv) converts the identified intelligence information and insights of synthesized normalized data points into one or more stories, and
      (v) communicates the one or more stories via a feed presented via a user interface;
   a machine learning unit that:
   extracts features and attributes of user activities occurring at the one or more stories;
   generates a data processing model based on the extracted features and attributes of user activities, wherein the data processing model enhances the applied one or more anomaly detection schemes to improve anomaly and outlier detection in the normalized data points; and
   applies the data processing model to one or more processes of the intelligence unit to thereby adjust the one or more processes performed by the intelligence unit, wherein:
   the one or more processes of the intelligence unit includes converting the identified intelligence information and insights of the synthesized normalized data points into one or more stories, and
   the data processing model enhances the conversion of the identified intelligence information and insights of the synthesized data points into the one or more stories to thereby generate one or more enhanced stories having an improved probability of interest, wherein the probability of interest indicates a probability that a user is interested in a story, ones of the generated one or more enhanced stories having a low probability of interest is compiled into the story having a high probability of interest so that the user has an option to explore the stories having a low probability of interest.

2. The system according to claim 1, wherein the intelligence unit formulates content based on (a) the statistical attributes of the normalized data points and (b) the identified one or more anomalies and one or more outliers of the normalized data, wherein formulated content is provided within the one or more stories.

3. The system according to claim 2, wherein the formulated content provided by the intelligence unit comprises:
a description portion that provides a written description describing the intelligence information; and
illustration portion that provides analytical illustrations or drawings of the statistical attributes of the normalized data points, wherein the analytical illustrations or drawings are also of the identified one or more anomalies and one or more outliers of the normalized data.

4. The system according to claim 3, wherein the description portion or the illustration portion of the formulated content within the one or more stories further comprises selectable features that, when selected, allows for additional analysis of the normalized data points forming basis of the one or more stories to be performed.

5. The system according to claim 2, wherein the formulated content of the one or more stories includes one or more of characteristics of the data points, noteworthy changes in data characteristics, quality descriptions of the data points, relationships and changes in relationships of the data points, summaries of sets of stories, forecasting based on the data points, comparative and normative descriptions of the data points, recommendation and suggestions based on the data points, noteworthy and relevant news associated with the data points.

6. The system according to claim 1, wherein each story of the one or more stories includes one or more additional sub-stories, wherein the one or more additional sub-stories comprise additional content formulated by the intelligence unit that is different but sufficiently related to the formulated content of the one or more stories.

7. The system according to claim 1, wherein
at the intelligence unit:
defining a simultaneous temporal joint that combines data points of at least two disparate stories of the one or more stories, wherein data points of the at least two disparate stories are associated with a time of occurrence that is substantially similar among the data points of both of the at least two disparate stories.

8. The system according to claim 1, wherein
at the intelligence unit:
defining a temporal joint that combines data points of at least two disparate stories of the one or more stories, wherein data points of the at least two disparate stories are associated with windows of time of occurrence that substantially overlap, are associated with windows of time that occur in a logical sequence, or are associated with windows of time that are related or correlated to each other.

9. The system according to claim 1, wherein the machine learning unit:
extracts features and attributes of user activities occurring at the one or more stories;
generates the data processing model based on the extracted features and attributes of user activities; and
applies the data processing model to one or more processes of the data characterization unit thereby adjusting the one or more processes performed by the data characterization unit.

10. The system according to claim 9, wherein the one or more processes of the data characterization unit includes applying one or more anomaly detection schemes to identify one or more anomalies and one or more outliers of the normalized data points.

11. The system according to claim 9, wherein the machine learning unit further:
extracts features and attributes of a user profile, wherein the user profile identifies a role of a user within a business entity;
extracts features and attributes of the activities of the user occurring at one or more stories associated with the user profile; and
generates a role-based data processing model specific to the user based on the extracted features and attributes of the user profile and the activities of the user.

12. The system according to claim 1, wherein the plurality of data streams comprises entity data and global data, wherein entity data is data associated with one or more operations of an entity and global data is data resulting from processes, operations, or events other than those associated with the entity.

13. The system according to claim 12, wherein data points within each of the plurality of data streams are multi-dimensional or multi-faceted, such that each of the data points can be further segmented or differentiated based on one or more dimensions or one or more facets associated therewith, wherein each dimension of the one or more dimensions or each facet of the one or more facets of the data points is a categorical descriptor of the data points corresponding to a property of the data points.

14. The system according to claim 12, wherein the data processing platform is a cloud-based data processing platform that aggregates and analyzes data streams for a plurality of entities.

15. The system according to claim 14, wherein the intelligence unit leverages the data and analysis associated with each entity of the plurality of entities to identify performance or rank information for each entity of the plurality of entities, wherein the performance or rank information indicates a performance or rank of an entity of the plurality of entities with respect to other entities of the plurality of entities that use the system.

16. A system according to claim 15, wherein the formulated content of at least one of the one or more stories includes performance or ranking information of an entity.

17. The system according to claim 1, wherein at the data aggregation unit: joining a plurality of data points from each data stream of the plurality of data streams in a sequential time order thereby defining a sequential temporal joint of data points, wherein each data point in the plurality of data points of the sequential temporal joint is associated with a time of occurrence that is different between each data point of the plurality of data points, wherein the time of occurrence for each data point is defined by a time at which an event associated with the data point occurred, or joining a plurality of data points from each data stream of the plurality of data streams in a simultaneous time order thereby defining a simultaneous temporal joint of data points, wherein each data point in the plurality of data points of the simultaneous temporal joint is associated with a time of occurrence that is the same among the data points of the plurality of data points, wherein the time of occurrence for each data point is defined by a time at which an event associated with the data point occurred.

18. A data processing system comprising:
one or more computer processors and a memory storing instructions that are executed by the one or more processors, to cause the one or more processors to perform operations comprising:
at a data processing platform:
receiving, over a network, a plurality of data streams from a plurality of remote data sources;
normalizing each data point of a plurality of data points of the plurality of data streams by associating said each data point of the plurality of data points with meta data information;
analyzing the normalized data points and associated meta data information to identify attributes of the normalized data points, and
applying one or more anomaly detection schemes to identify one or more anomalies and one or more outliers of the normalized data points;
identifying intelligence information by synthesizing (a) the attributes of the normalized data points and (b) the identified one or more anomalies and one or more outliers of the normalized data points;
converting the identified intelligence information and insights of synthesized normalized data points into one or more stories;
extracting features and attributes of user activities occurring at the one or more stories;
generating a data processing model based on the extracted features and attributes of user activities, wherein the data processing model enhances the applied one or more anomaly detection schemes to improve anomaly and outlier detection in the normalized data points;
applying the data processing model to one or more processes of a intelligence unit to thereby adjust the one or more processes performed by the intelligence unit, wherein:
the one or more processes of the intelligence unit includes converting the identified intelligence information and insights of the synthesized normalized data points into the one or more stories, and
the data processing model enhances the conversion of the identified intelligence information and insights of the synthesized data points into the one or more stories to thereby generate one or more enhanced stories having an improved probability of interest, wherein the probability of interest indicates a probability that a user is interested in a story, wherein ones of the generated one or more enhanced stories having a low probability of interest is compiled into the story having a high probability of interest so that the user has an option to explore the stories having a low probability of interest.

19. A computer-implemented method of processing data comprising:
receiving, by a computer over a network, a plurality of data streams from a plurality of remote data sources;
normalizing, by a computer, each data point of a plurality of data points of the plurality of data streams by associating said each data point of the plurality of data points with meta data information;
analyzing, by a computer, the normalized data points and associated meta data information to identify attributes of the normalized data points, and
applying, by a computer, one or more anomaly detection schemes to identify one or more anomalies and/or one or more outliers of the normalized data points;
identifying, by a computer, intelligence information by synthesizing (a) the attributes of the normalized data points and (b) the identified one or more anomalies and/or one or more outliers of the normalized data points;
converting the identified intelligence information and insights of synthesized normalized data points into one or more stories;
extracting, by a computer, features and attributes of user activities occurring at the one or more stories;
generating, by a computer, a data processing model based on the extracted features and attributes of user activities, wherein the data processing model enhances the applied one or more anomaly detection schemes to improve anomaly and outlier and detection in the normalized data points; and
apply, by a computer, the data processing model to one or more processes of the intelligence unit to thereby adjust the one or more processes performed by an intelligence unit, wherein:
the one or more processes of the intelligence unit includes converting the identified intelligence information and insights of the synthesized normalized data points into the one or more stories, and
the data processing model enhances the conversion of the identified intelligence information and insights of the synthesized data points into the one or more stories to thereby generate one or more enhanced stories having an improved probability of interest, wherein the probability of interest indicates a probability that a user will be interested in a story, wherein ones of the generated one or more enhanced stories having a low probability of interest is compiled into the story having a high probability of interest so that the user has an option to explore the stories having a low probability of interest.

\* \* \* \* \*

UNITED STATES PATENT AND TRADEMARK OFFICE
CERTIFICATE OF CORRECTION

PATENT NO. : 10,313,466 B2  
APPLICATION NO. : 15/281516  
DATED : June 4, 2019  
INVENTOR(S) : Sean Byrnes et al.

Page 1 of 1

It is certified that error appears in the above-identified patent and that said Letters Patent is hereby corrected as shown below:

In the Claims

Column 28, Line 49:
In Claim 16, delete "A" and insert --The-- therefor

Column 30, Line 32:
In Claim 19, after "outlier", delete "and"

Signed and Sealed this  
Twenty-fifth Day of February, 2020

Andrei Iancu  
*Director of the United States Patent and Trademark Office*